United States Patent
Kay et al.

(10) Patent No.: US 7,266,585 B2
(45) Date of Patent: *Sep. 4, 2007

(54) METHOD AND SYSTEM FOR USING SCREEN NAMES TO CUSTOMIZE INTERACTIVE AGENTS

(75) Inventors: Timothy Kay, Los Altos, CA (US); Robert Hoffer, Allendale, NJ (US)

(73) Assignee: Colloquis, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/225,981

(22) Filed: Sep. 14, 2005

(65) Prior Publication Data

US 2006/0031365 A1    Feb. 9, 2006

Related U.S. Application Data

(63) Continuation of application No. 10/227,595, filed on Aug. 23, 2002, now Pat. No. 7,146,404, which is a continuation-in-part of application No. 10/107,982, filed on Mar. 26, 2002, now Pat. No. 6,993,555, which is a continuation of application No. 09/643,262, filed on Aug. 22, 2000, now Pat. No. 6,430,602.

(51) Int. Cl.
*G06F 15/16* (2006.01)

(52) U.S. Cl. .............. 709/206; 709/202; 709/207; 709/225; 709/226

(58) Field of Classification Search ........ 709/202–207, 709/225–226; 707/3–5, 9–10; 455/412.1–412, 455/414.1, 466

See application file for complete search history.

(56) References Cited

U.S. PATENT DOCUMENTS

| | | | |
|---|---|---|---|
| 5,764,916 | A | 6/1998 | Busey et al. |
| 5,826,269 | A | 10/1998 | Hussey |
| 5,894,556 | A | 4/1999 | Grimm et al. |
| 5,951,694 | A | 9/1999 | Choquier et al. |
| 5,978,799 | A | 11/1999 | Hirsch |

(Continued)

FOREIGN PATENT DOCUMENTS

EP          0944004          9/1999

(Continued)

OTHER PUBLICATIONS

Kyheroinen, P., Transactions, www.niksula.cs.hut.fi/-patze/secur_sem.html, pp. 1-16, Nov. 1996.

(Continued)

*Primary Examiner*—Bharat Barot
(74) *Attorney, Agent, or Firm*—Vierra Magen Marcus & DeNiro LLP

(57) ABSTRACT

A method for using the screen names of users are used to appropriately tailor a service for the users. If the service is a restricted service, then the screen name is used as the basis for deciding whether access should be granted to ensure that access is granted to a limited set of users. Alternatively, if the service is comprised of several component sub-services, and some of those sub-services are restricted, then the screen name is used as the basis for deciding whether access should be granted to the relevant sub-service.

53 Claims, 13 Drawing Sheets

U.S. PATENT DOCUMENTS

| | | | |
|---|---|---|---|
| 5,990,887 | A | 11/1999 | Redpath et al. |
| 6,023,510 | A | 2/2000 | Epstein |
| 6,192,394 | B1 | 2/2001 | Gutfreund et al. |
| 6,192,407 | B1* | 2/2001 | Smith et al. ............... 709/229 |
| 6,259,969 | B1 | 7/2001 | Tackett et al. |
| 6,260,041 | B1 | 7/2001 | Gonzalez et al. |
| 6,289,390 | B1 | 9/2001 | Kavner |
| 6,301,609 | B1 | 10/2001 | Aravamudan et al. |
| 6,314,410 | B1 | 11/2001 | Tackett et al. |
| 6,332,141 | B2 | 12/2001 | Gonzalez et al. |
| 6,346,952 | B1* | 2/2002 | Shtivelman ............... 715/758 |
| 6,363,301 | B1 | 3/2002 | Tackett et al. |
| 6,430,602 | B1 | 8/2002 | Kay et al. |
| 6,442,590 | B1 | 8/2002 | Inala et al. |
| 6,446,112 | B1 | 9/2002 | Bunney et al. |
| 6,549,937 | B1 | 4/2003 | Auerbach et al. |
| 6,604,090 | B1 | 8/2003 | Tackett et al. |
| 6,629,087 | B1 | 9/2003 | Benson et al. |
| 6,629,136 | B1 | 9/2003 | Naidoo |
| 6,668,169 | B2* | 12/2003 | Burgan et al. ............ 709/219 |
| 6,668,173 | B2 | 12/2003 | Greene |
| 6,678,673 | B1* | 1/2004 | Eves et al. .................... 707/3 |
| 6,678,720 | B1 | 1/2004 | Matsumoto et al. |
| 6,691,162 | B1 | 2/2004 | Wick |
| 6,699,125 | B2 | 3/2004 | Kirmse et al. |
| 6,714,793 | B1* | 3/2004 | Carey et al. ............... 455/466 |
| 6,741,855 | B1 | 5/2004 | Martin et al. |
| 6,750,881 | B1* | 6/2004 | Appelman ................. 715/733 |
| 6,760,580 | B2* | 7/2004 | Robinson et al. .......... 709/204 |
| 6,785,681 | B2 | 8/2004 | Keskar et al. |
| 6,807,562 | B1 | 10/2004 | Pennock et al. |
| 6,839,554 | B2 | 1/2005 | McDowell et al. |
| 6,907,571 | B2 | 6/2005 | Slotznick |
| 6,993,555 | B2* | 1/2006 | Kay et al. ................... 709/202 |
| 6,993,564 | B2 | 1/2006 | Whitten, II |
| 2001/0042126 | A1 | 11/2001 | Wong et al. |
| 2002/0103917 | A1 | 8/2002 | Kay et al. |
| 2003/0131061 | A1 | 7/2003 | Newton et al. |
| 2003/0210265 | A1 | 11/2003 | Haimberg |

FOREIGN PATENT DOCUMENTS

| | | |
|---|---|---|
| WO | 99/44152 | 9/1999 |

OTHER PUBLICATIONS

Lozano, Fernando, Introduction, to Relational Database Design, EDM/2, edm2.com/0612/msql7.html, pp. 1-14, Dec. 1998.

MIT Project Athena, "ZAWAY (1)", (Jul. 1, 1988), ("ZAWAY (1)"), final.gov/docs/products/zephyr/zaway.html. (2 pgs.).

MIT Project Athena, "ZEPHYR (1)", (Jul. 1, 1988), (ZEPHYR (1):), final.gov/docs/products/zephyr/ZEPHYR.html. (2 pgs.).

Netscape AOL Instant Messenger: Quick Tips for Getting Started, aim.com/netscape/quiktips.html, pp. 1-5, Jun. 1998.

New and New Products Briefs (Feb. 15, 1998). [online]. Javaworld. [Retrieved on Aug. 10, 2004]. Retrieved from the Internet: <URL: javaworld.com/javaworld/jw-03-1998/jw-03-newsbriefs_p.htm> (27 pgs.).

New and New Products Briefs (Sep. 15, 1998). [online]. Javaworld. [Retrieved on Aug. 10, 2004]. Retrieved from the Internet: <URL: javaworld.com/javaworld/jw-10-1998/jw-10-newsbriefs_p.html> (3 pgs.).

PCT Notification of the International Search Report or the Declaration, 4 pgs., no date.

Robert S. French and John T. Kohl, "The Zephry Programmer's Manuel", (Apr. 5, 1989), ("Zephyr programmer's manuel").

Sharon Belville and Dan Pop, "Zephyr at CERN," (Version 1.0, Jul. 15, 1993), (Zephyr at CERN), consult.cern.ch/writeup/zephyr/main.html.

Activerse and ObjectsSpace Join for Java-Enhanced DingBots. [online]. Invernetnews. [Retrieved on Aug. 10, 2004]. Retrieved from the Internet: RL:internetnews.com/devnews/print.php/54941. (3 pgs.).

Bermabt, C., In the First Lane Instant Messaging: Seattle Times, p. C. 1, pp. 1-4 as printed, Aug. 22, 1999.

Bone, J., RVP Schemas, draft -dusseault-rvp-schema-00.txt, IETF, pp. 1-14, Mar. 1998.

Carla J. Fermann, Distributed Consulting in a Distributed Environment:, Proceedings of the XVIII ACM conference on User Services, 1990, ("Distributed Consulting") (7 pgs.).

Chghid,pl Script, Gamma Burst, Inc., gamma-burst.com/members/chghid.pl.txt, pp. 104, Aug. 1998.

Coleman, P., Something to Talk About, webserver.cpg.com/features/f2/2.11/pp. 1-6, Dec. 1997.

CS 596 Java Programming Fall Semester, 1998 Ding!. [online]. San Diego State University. Retrieved.

Fiedler, D., Activerse Releases DingBot SDK Beta, interviewnews.com/dev-news/print.php/54661, pp. 1-3, Aug. 10, 1998.

Hidden Page Setup, Gamma Burst, Inc., gamma-burst.com/tutorial/gvset.html, pp. 1-2, Jan. 11, 2000.

Index of /afs/sipb.mit.edu/services/logging/src/zephyr, (last modified Sep. 1, 1997), ("Index #1") mit.edu.afs/sipb.mit.edu/service/logging.src/zephyr. (2 pgs.).

Stenvold, L., User Experience of Work Group Awareness Information Provided By a Buddy List Application, Telenor Research and Development, report TFoU R21/99, pp. 1-20, Aug. 8, 1999.

The Student Information Processing Board, Abbe Cohen, "Inessential Zephyr" (Aug. 23, 1993) ("Inessential Zephyr") mit.edu/afs/sipb/project/doc/izephyr/html/izephyr.html; mit.edu/afs/sipb/project/doc/izephyr//html. 1993.

Yahoo Helper Demonstration Stration, Nov. 27, 2001. (1 pg.).

The Tech, Naveen Sunkavally and Gabriel Daleson, "Using MIT's Athena Computing System" (Sep. 2, 1999) ("The Tech") tech.mit.edu/V119/N39athena.39n.html.

Triumph PC Press Releases, triumphpc.com/PressMedia, pp. 108, various dates, no date.

Zaway, 1 (last modified Sep. 23, 1988), "Zaway. 1 code"), mit.edu/afs/sipb.mit.edu/service/logging/src/zephyr/clients/zaway/zaway.1. (5 pgs.).

Zaway, c, (last modified Jul. 7, 1995), ("Zaway.c.code") mit.edu/afs/sipb.mit.edu/service/logging/src/zephyr/clients/zaway/zaway.c (7 pgs.).

* cited by examiner

METHOD AND SYSTEM FOR USING SCREEN NAMES TO CUSTOMIZE INTERACTIVE AGENTS

CROSS REFERENCE TO RELATED APPLICATION

This patent application is a continuation of U.S. patent application Ser. No. 10/227,595, filed Aug. 23, 2002, now U.S. Pat. No. 7,146,404, issued on Dec. 5, 2006, entitled "METHOD FOR PERFORMING AUTHENTICATED ACCESS TO A SERVICE ON BEHALF OF A USER," which is a continuation in part of U.S. patent application Ser. No. 10/107,982, filed Mar. 26, 2002, now U.S. Pat. No. 6,993,555, issued on Jan. 31, 2006, entitled "METHOD AND SYSTEM FOR INTERACTIVELY RESPONDING TO INSTANT MESSAGING REQUESTS," which is a continuation of U.S. patent application Ser. No. 09/643,262, filed Aug. 22, 2000, now U.S. Pat. No. 6,430,602, issued on Aug. 6, 2002, entitled "METHOD AND SYSTEM FOR INTERACTIVELY RESPONDING TO INSTANT MESSAGING REQUESTS," which are hereby incorporated by reference in their entirety.

BACKGROUND

1. Field of the Invention

This invention is directed to a method and system for autonomously processing requests from remotely located users. More particularly, this invention is directed to a method and system for tailoring services based on a screen name of a requesting user.

2. Description of the Related Art

Internet users are well versed in accessing the Internet using widely available web browsing software to search for desired information. The web browser software permits users to access various automated search engines and, by entering appropriate queries, identify web pages which may contain the information of interest. While a wide variety of information is available in this manner, most web pages are directed to specific types of information. As a result, users who are seeking information in various diverse topics will often need to locate and access multiple, and perhaps unrelated, web pages. While users can find a great deal of in-depth information regarding particular topics, it can often be very difficult to obtain answers to short and specific questions due to the overwhelming number of web pages which will be identified in conventional indexing and search engine-based systems.

Various efforts have been made to aggregate diverse information onto one or a few web pages. However, these aggregated sites are often maintained by individual users as "personal web pages" and are thus of questionable reliability. Although some commercial web sites have been implemented for the purpose of aggregating information, these sites generally compete among each other for users and thus include many graphical features and expanded functionality to increase the site's attractiveness. However, this additional functionality also makes these sites more cumbersome and slow to access and use because of the additional data and processing overhead.

Another widely used Internet application is instant messaging ("IM"). IM services of one form or another are in use by an estimated 70 million people or more. Unlike Internet browsing software, which is used to access various web pages, IM is primarily used by a subscriber to "chat" with one or more other IM users. To access an IM service, a user registers with a service provider and, after connecting to the Internet (or other appropriate data network), enter their screen name and password to log in to the IM network. Popular IM applications include AOL's Instant Messenger and Microsoft's Network Messenger services. Once a user has logged in to the appropriate IM network, his presence on the system is made known to all authorized partners (commonly termed "buddies"). The user can then engage in typed conversations with other IM users connected to the system.

Because IM is a text-based service, instant messaging communication is generally not burdened by the need to transfer large graphic, sound, or program files. As a result, instant messaging is a relatively quick and easy to use system. However, while instant messaging is widely available, its value as a means to access and retrieve data from a remotely located automated system has not been fully appreciated.

Users of IM services often simultaneously use Internet browsers to access web pages. It is not uncommon for an IM user to forward a link to a web page of interest via the IM service to another user. However, if the indicated web page contains sensitive information, a user subsequently following the link to access the web page may be required to enter a username and password. Even though the user has already signed in to the IM service, and thus is already authenticated, the accessed web site generally has no knowledge of this authentication.

Instant messaging services were originally designed to facility person-to-person communication. Here, a user runs IM client software on their terminal device, such as a computer at work, a computer at home, a television set-top box, a cell phone, an IM appliance, or the like. The IM client software communicates over a network to an IM service. However, the user must first login to the IM service by providing both a unique identifier, called a "screen name," and a secret password.

After validating the password, the IM service then provides certain information and services to the user. The information provided by the IM service includes (but is not limited to) a stored contact list, which is a list of screen names with whom the user commonly frequently communicates. The IM service will also provide information about preference settings selected by the user. The preference settings may be used to control the behavior of client software, such as whether to play sounds when certain events occur.

The ability of the IM service to store information permits a user to log in from different terminal devices and access the same stored information. As a result, the user experience is consistent regardless of the point of access. The ability to login from different terminal devices while obtaining the same user experience is called "roaming."

The services provided by the IM service include "presence detection" for the screen names in the contact list: the service continuously updates the online status of each of the screen names mentioned in the contact list. By way of visual presentation of the contact list, the IM service may inform the user of the on-line status and the idle status of other contacts.

The IM service also provides messaging services. A user wishing to communicate with another user can click on the other user's screen name in the contact list, or by some other mechanism provided by the IM client software, to indicate the screen name of the other user. The IM service then establishes a communications channel between the two users and delivers short messages between the user in real-time.

It is possible to implement IM services wherein the identities of the users are not authenticated, such as Internet electronic mail (e-mail) and Internet Relay Chat (IRC). User authentication was a key innovation that made IM different from other Internet messaging services. User authentication permits the IM service to keep track of individualized profile settings, thereby enabling roaming. During user authentication a unique key (e.g., the screen name) is assigned to each user such that their personal settings can be stored and retrieved in a secure and reliable manner.

User authentication enables presence detection. In this case, it is pointless to have a contact list unless the meaning of each screen name is constant and unique. Unique screen names permit consistent identification of users to the other users.

In addition, user authentication provides a user with the confidence of knowing that instant messages they receive originated from people that are identified as the senders of the instant messages. Unlike a message that is received via Internet e-mail or IRC, the identity of the sender of an instant message is very difficult to forge.

In most cases, instant messaging services are offered by service providers as part of a larger offering. For example, in addition to offering instant messaging services Yahoo!.®™., Microsoft.®™. Network, and AOL.®™. each offer a wide variety of services. The variety of services including, e-mail, address book, calendar, and portfolio) services, are referred to as "sibling services."

Often, a user of the instant messaging service will also use the related services. At the user's option, a single account and password can be used to authenticate the user and provide access to all related services. However, the account name is reserved across all related services regardless of whether or not a user chooses to share accounts among related services. As a result, only that user will possess the right to access the related services via the reserved account name.

Originally, the sole intent when IM services were created was to facilitate person-to-person communication. An interactive agent is a software program that has its own screen name and password, and logs into an IM service as though it were a user. A user interacts with the interactive agent in much the same way that the user would talk to another person. The user can add the screen name of the interactive agent to their contact list. In addition, the user can initiate a conversation with the interactive agent by either clicking on the appropriate screen name in the contact list or by some other mechanism as provided by the IM client software. The interactive agent receives a message from a user, parses that message, formulates an answer, and sends that answer back to the user.

Further, an interactive agent can provide a variety of services to a user via the IM service. For example, (i) games, such as word games and card games; (ii) information, such as stock quotes, weather reports, movie listings, and news; (iii) conversations; (iv) control, such as setting up a telephone conference call or activating the lawn sprinklers of a home; and (v) access, such as querying a database.

Some services are "restricted services," where the service provider wishes to control access to the service, so that only certain people may access certain parts of the service. The traditional mechanism for restricting access to a service is to issue an account and password. For example, a user wishing to access his bank balance using a Web browser must first go through a registration process, whereby the bank creates a new account and password for the user. Only after the user has obtained the new account and password, can he then access his banking information.

The user must repeat the registration process for each bank account, credit card, etc., that he wishes to access. In this situation, the user must track a password for each account.

One advantage to combining instant messaging with interactive agents is that the interactive agent can provide instant access to restricted services without the need to create an account and password for each user. Due to the very nature of instant messaging, the sender of an instant message is authenticated a priori. By way of instant messaging, an interactive agent can provide a user with access to restricted services by using the user's screen name as the account. Here, a password is not necessary; the fact that the message arrived via the IM service indicates that the user was previously authenticated.

SUMMARY OF THE INVENTION

The invention is a method and system for providing services via an instant messaging service. The system includes a message server which is connected to a data network through an instant messaging port. The server is logged in to the IM network and assigned a designated screen-name, such as "ACTIVEBUDDY". When the message server receives an IM message from a user, the message is processed to determine the type of request made by the user and the appropriate actions necessary to service the request. In one embodiment, the request is an informational query. In response to such a request, the message server directs the query to an appropriate query response server, which server will interpret the request and return a suitable answer. The query response server(s) can be local to the message processing server or remotely accessed, e.g., via the Internet. The received answer is embedded in a message which is returned to the user, preferably over the IM system. Alternatively, the message server can interpret the request directly using various natural language processing techniques known to those skilled in the art. In one configuration, a table of query patterns is provided and the table is searched to identify the pattern which most closely matches the received request. A designated local or remotely located resource is then accessed to determine an answer for the query, which answer is returned to the user.

It will be appreciated that, in order to generate an accurate answer to many types of queries, additional or secondary information may be required to fill in unstated assumptions in the query. To aid in providing this information, a user profile can be maintained by the system in which commonly needed information is stored. The types of information suitable for placement in the profile include static data such as the user's birth date, place of residence, fairly static information, such as stock portfolio data, and dynamic information, such as information gleaned from the prior most recent communications with the user. When the system determines that additional information is required, either by processing the request directly or in response to a message forwarded by a query response system indicating that more data is needed to process the request, the information is retrieved from the profile.

If the needed additional information is not already present in the user's profile and cannot be reasonably determined through other intermediate data searches, the user can be solicited to provide the additional information. Such solicitation can be through a query message sent to the user over the IM network or by means of a message instructing the user to access and update their profile via a designated web site. After the additional data is received from the user, the original query is reprocessed with the additional data and the result is returned to the user. The additional data can be stored in the user's profile for use in the future. In addition, information extracted from a prior request or provided in an answer can also be stored in the user profile for at least a predetermined period of time to permit the user to ask a series of questions or make a series of request related to a particular item without having to specify the same item in every request. For example, a user can issue a query asking the local time in New York City. In a following query, the user can simply ask "What is the weather today?" The object of the first request (New York) is used to process the second request. Processing and reusing data in this way makes the resulting text dialog appear more natural and simplifies use of the system.

During the course of one or more requests, it may become necessary to ask a user to enter a large amount of information or take another action which is easier to perform in an Internet browser environment. According to a further aspect of the invention, a method and system is also provided to allow authenticated access to a particular web page by directing the user to that page using a link which is provided in an instant message. When a user is to be given authenticated accessed to a web page, the system generates an access key, which can be, for example, a random number of a suitable length. A uniform resource locator ("URL") is then generated which includes the key and which is associated with the selected web page.

The key-containing URL is forwarded to the user in a message using the instant messaging protocol. When the user receives the message, the user can click on (or otherwise select) the URL to activate their web browser and direct it to the designated location. When the system receives a request for access to a web page, the specified URL is parsed to extract an embedded key. This key is then used to identify the particular web page to which the user has been granted access and the web page is served to the user. To increase security of the system, the various keys can expire after a short period of time and also after they are used once to access a web page. Advantageously, this technique leverages the authentication mechanism of the instant messaging system by granting access to the designated web pages only to users who have successfully logged in to an instant messaging service. As a result, the user does not need to divulge their IM password or remember another user ID and password combination. In addition, because the web page/key association expires after a single use and in a designated period of time in any case, it is highly unlikely that the key could be intercepted and used by an unauthorized party during its validity period and without detection.

In an additional aspect of the invention, the screen names of users are used to appropriately tailor a service for the users. Customization of the service using the screen name is accomplished in a number of ways. For example, if the service is a restricted service, then the screen name is used as the basis for deciding whether access should be granted to ensure that access is granted to a limited set of users. Alternatively, if the service is comprised of several component sub-services, and some of those sub-services are restricted, then the screen name is used as the basis for deciding whether access should be granted to the relevant sub-service. In accordance with the alternative embodiment, prior to performing the authorization step, the service first parses the query to determine which component sub-service will formulate the response.

BRIEF DESCRIPTION OF THE DRAWINGS

The foregoing and other features of the present invention will be more readily apparent from the following detailed description and drawings of the illustrative embodiments of the invention in which.

DETAILED DESCRIPTION OF THE EXEMPLARY EMBODIMENTS

Figure 1:
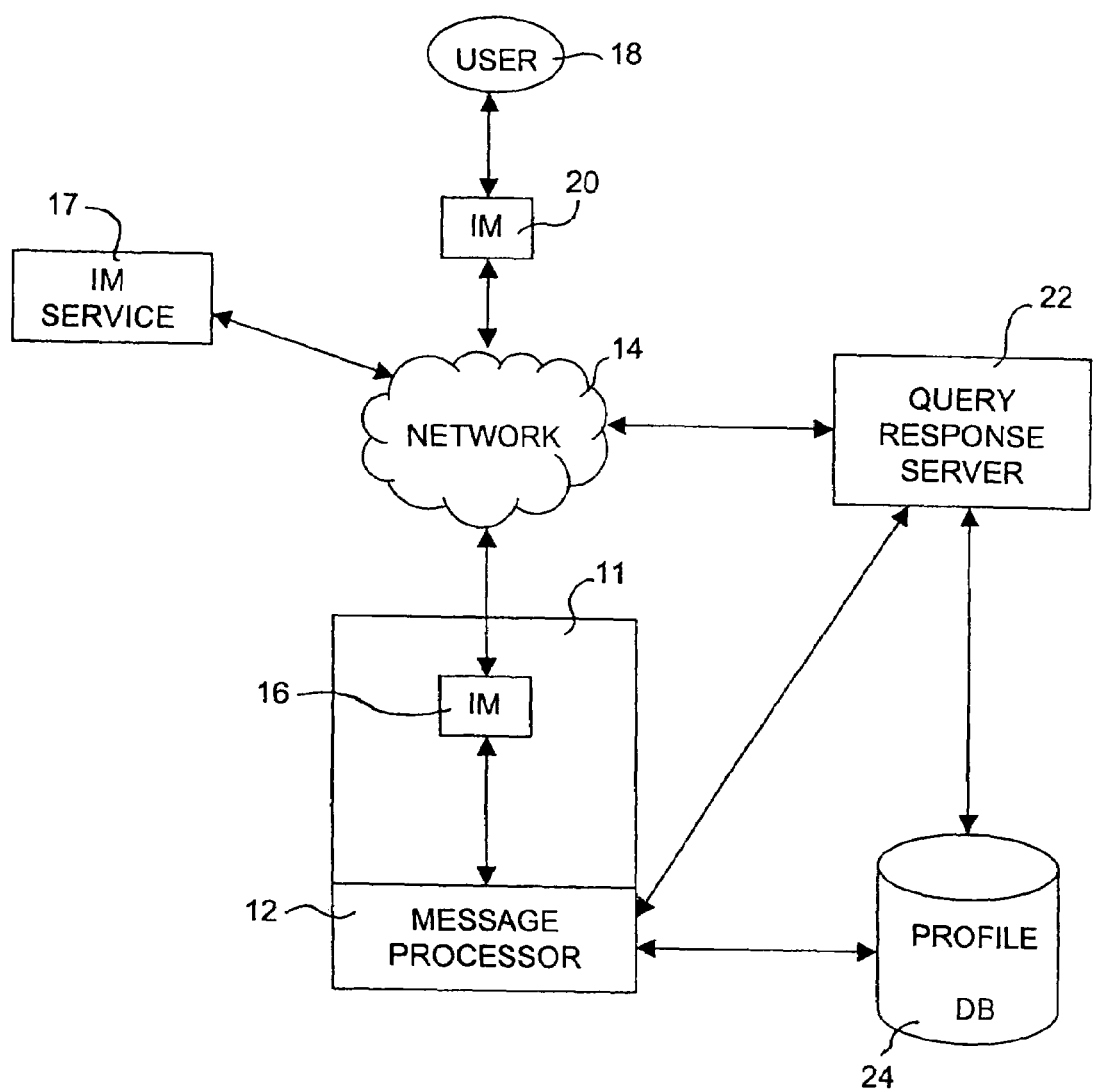
FIG. 1 shows a high level block diagram of a first embodiment of a system implementing various aspects of the invention.

Turning to FIG. 1 there is shown a block diagram of a system 10 for interactively responding to requests or queries from a remotely located user. The system comprises a message router 11 which includes message processor 12. Processor 12 is coupled to a data network 14 and is logged in as a user of an instant messaging service provider 17 through an appropriate IM application or routine 16. A user 18 is connected to the network 14 and the IM service provider 17 through an instant messaging gateway 20. The instant messaging gateway 20 will typically be provided by an IM service provider to which the user has subscribed and allows access to the IM system after the user has logged in. The IM application 16 between message processor 12 and the network 14 is configured to enable access to the appropriate IM service provider(s). To provide instant messaging communication between message processor 12 and a plurality of users, which users may subscribe to different instant messaging providers, it may be necessary for message processor 12 to connect to a number of different IM service providers 17 through different gateways 16 or via a single IM protocol gateway 16 with several I/O processing routines to address situations where various messaging service providers do not share a data common protocol.

In an instant messaging environment, each user is provided with a unique screen name which is included as part of a message sent from the user to a designated destination. To direct a query or other request to messaging processor 12, a user, after logging sends an instant message containing the request to the screen name assigned to the message processor 12, such as "ACTIVEBUDDY." The message processor 12 is logged into the IM system and the IM system directs the message through the network to the processor 12.

When message processor 12 receives a request from the user, the screen name of the user is stored and, in this embodiment, the request, is forwarded to a local or remotely located query response server 22. In practice, query response server 22 will include a natural language interpreter or other smart system which is capable of responding to queries and other request of an arbitrary nature related to topics within at least a specified range of issues by generating an appropriate answer. The answer generated by query response server 22 is returned to the message processor 12 where it is incorporated into an output message which is subsequently sent to the user through the IM network. Alternatively, or in addition, the output message can be forwarded to the user through any other designated means, including e-mail, fax, text messaging to wireless or hand-held devices, voice mail (via a text to speech output system), or any other type of messaging system specified by the user.

Various types of information received during the query response interaction can be stored for later use in a user profile database 24 which contain various user profiles associated which each user. The profiles can be keyed to a user screen name in combination with the name of the instant messaging provider, for example "john@aol". The profile database 24 is preferably maintained on a separate server which is accessible to both message processor 12 and query response server 22, although other data storage configuration are feasible. By storing data provided by the user during a profile set up session and/or in response to data solicitation requests, a sophisticated query system can be provided which can make use of secondary or implied information to return a response which is more accurate or based on implicit data which need not be entered by the user in each query.

For example, a user may issue a query "What is the weather in Sunnyvale?" The query response server would process this query, determine the most likely "Sunnyvale" based on available information about the user, and access a suitable Internet weather resource to obtain the weather report for, e.g., Sunnyvale, Calif. In addition, the user's profile can be dynamically updated with the location Sunnyvale. As a result, a default location (if one was not already present) is available for use in subsequent location-dependent queries where the user does not specify a location. For example, the user may subsequently issue the query "Are there any outdoor concerts today?". In order to accurately answer this question, the query response server 22 must know a general geographic location. In this embodiment, the system could use the most recently mentioned geographic location, Sunnyvale, as the location for the search.

It will be appreciated that a large amount of default information can be provided in the user profile, such as a user age, or birth date, sex, place of residence, athletic teams of interest, stock portfolio information, etc. Because of the large quantity of information which can potentially be stored in the user profile, when a query from a user without a profile is detected, a "new user" procedure can be initiated in which the user is requested to provide various types of information to be stored in the user profile. In one embodiment, the user is directed to a specified profile web page in to which they can enter the various types of requested data. A most preferred method of directing the user to a web page is discussed in more detail below. In a more preferred embodiment, a user's profile is dynamically generated using information which is extracted from communications with the user, such as user-initiated queries.

Figure 2:
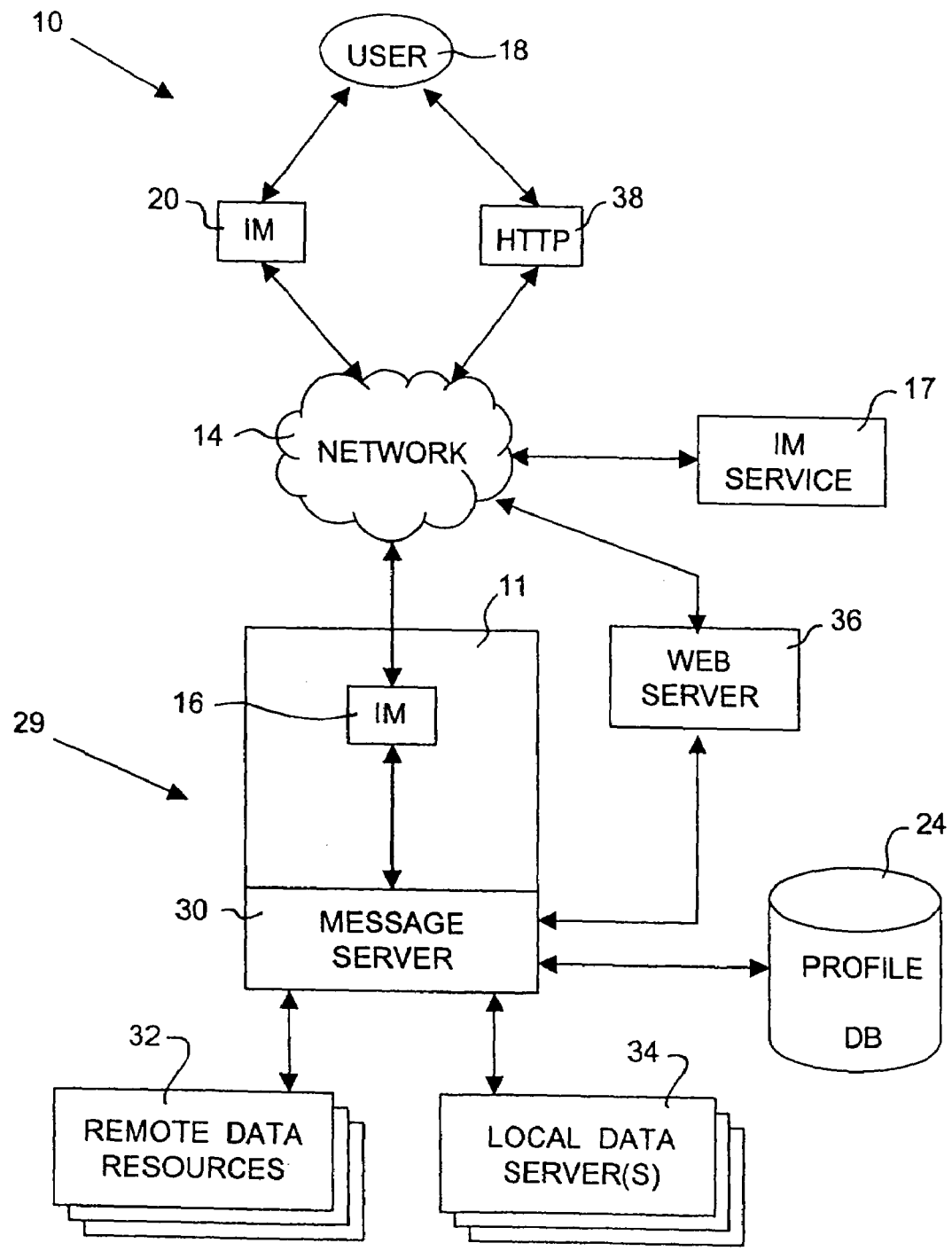
FIG. 2 is a block diagram of a second embodiment of a system implementing various aspects of the present invention.

Turning to FIG. 2 there is shown a block diagram of a system 10' according to a second embodiment of the invention. This embodiment is generally similar to the embodiment of FIG. 1 in that a message router 29 is provided which includes a message server 30 for responding to user's requests and which is connected to IM service 17 through a gateway 16. One primary difference is that the functionality of a separate query response server 22 of FIG. 1 is included within a local message server 30 such query processing is not outsourced as a matter of course. Message server 30 is connected to the profile database 24 and also to a series of remote and local data resources 32, 34. In addition, server 30 can be configured to access network 14 using multiple data protocols in addition to an IM protocol, and in particular, a hyper-text transfer protocol ("HTTP") link via web server 36, which protocol is the dominant form of data messaging used by Internet web browsers. Also shown in FIG. 2 is a similar web browser interface 38 available to user 18.

As discussed more fully below relative to the flow chart of FIG. 4, message server 30 interprets a message containing a query or other request received from the user over the IM gateway 16 and accesses the appropriate data resource to fulfill the request. The type of data resource accessed depends on the information needed of the action requested. For example, various types of static information may be locally stored. Information of this type can include, for example, a zip code and area code look up databases, measurement conversions, and various geographic databases, such as a mapping or direction system. A local partially or fully cached version of a remote database can also be provided. Data suitable for storage in a local cached copy of a remote database includes information which changes relatively infrequently, and thus would only need to be updated on a periodic basis, not continuously. Examples of data of this type include geographic and political information and entertainment history. For data which is continuously updated, the server is preferably connected to remote data resources through, for example, the Internet, to allow retrieval of up-to-date information. Data which is best suited for retrieval from such remote resources includes package tracking, stock prices, airline flight status, and weather. As will be recognized, the remote data resources may have different access protocols. Thus, a number of different access application programs may be required in order to properly format an appropriate query to the resource and properly process the received reply. In one particular embodiment, the message server 30 processes a received request at least sufficiently to identify the appropriate data resource to query and formats the data access request accordingly. As will be recognized by those of skill in the art, various intermediate levels of request interpretation, query generation and processing, etc., can also be performed.

Figure 3:
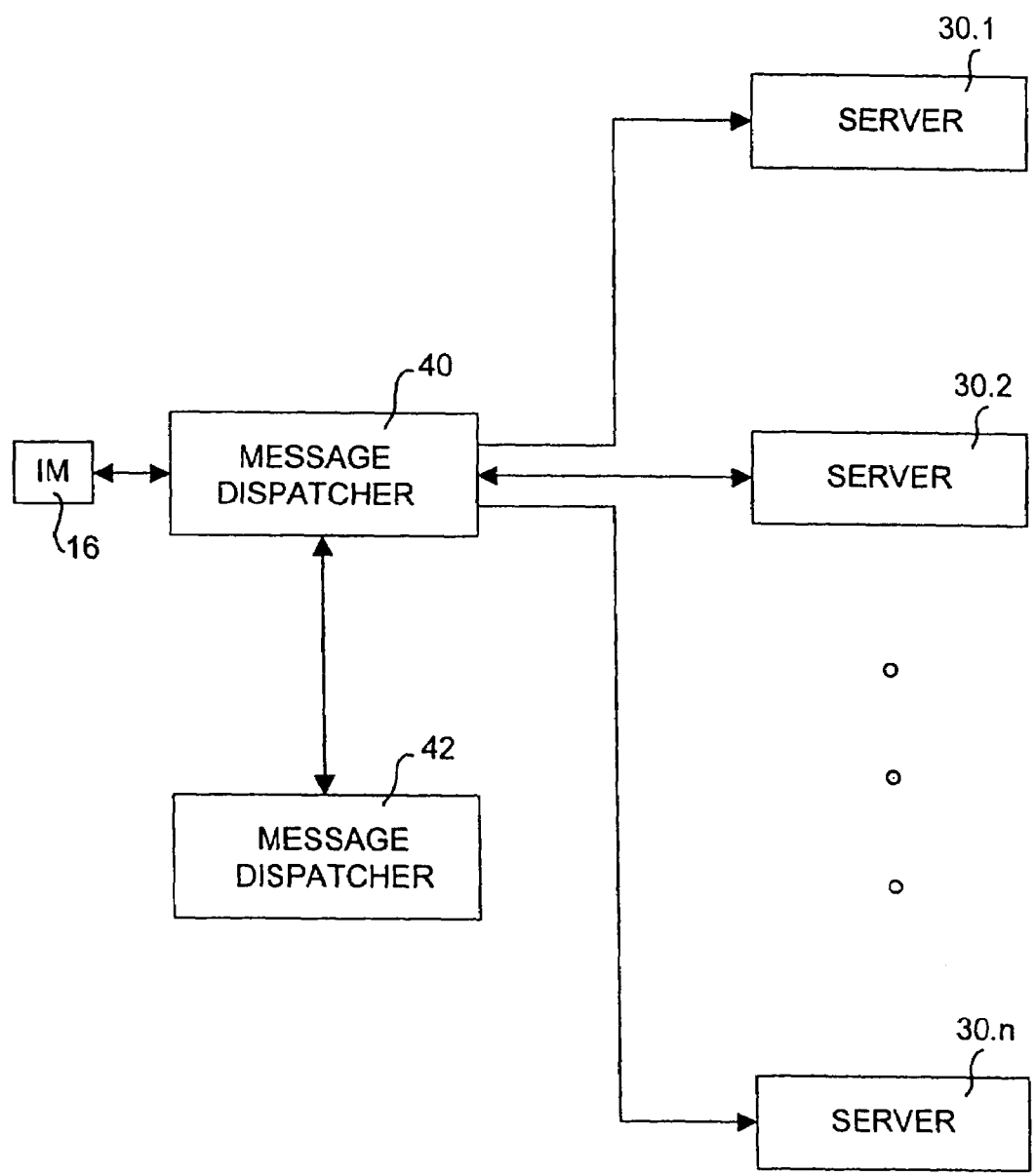
FIG. 3 is a block of a message routing system for use in the present invention.

In operation, a large number of requests or queries can be pending for many users at the same time. Thus a larger number of separate "conversations" may be ongoing. In order to increase the system response time and decrease the load on any particular server, preferably the incoming and outgoing instant messaging data stream is handled by a message router and forwarded to a plurality of servers 30.1 through 30.N as illustrated in FIG. 3. In one embodiment, the message dispatcher 40 maintains a table 42 of active users associated with each server (a user-server association table). When a message is received from a user not currently in the user-server table 42, that user is assigned to a server and placed in the user-server table, e.g., on a lowest load basis such that the server with the lowest number of active users is assigned the new users. Then, as data packets are received from the user through the instant messaging gateway 16, the data packets are processed by the message dispatcher 40 and routed to an appropriate server according to the user-server association table 42.

Advantageously, such a message dispatching system can be configured so that each server 30.x believes itself to be the only server in the system and is unaware of the intervening message router 40. In addition, the system can be configured so that the entire system or server 30.1 through 30.N appears to a user under the single screen name used by the system 10 (or 10'). This arrangement simplifies the addition of and removal of servers 30.x to the system without substantial reconfiguration being required. Various techniques for configuring a message router 40 will be known to those of skilled in the art. Preferably, the dispatcher 40 and user-server association table 42 are controlled with a suitable load balancing algorithm to evenly distribute the request load across the available server base in response to varying usage conditions.

Figure 4A:
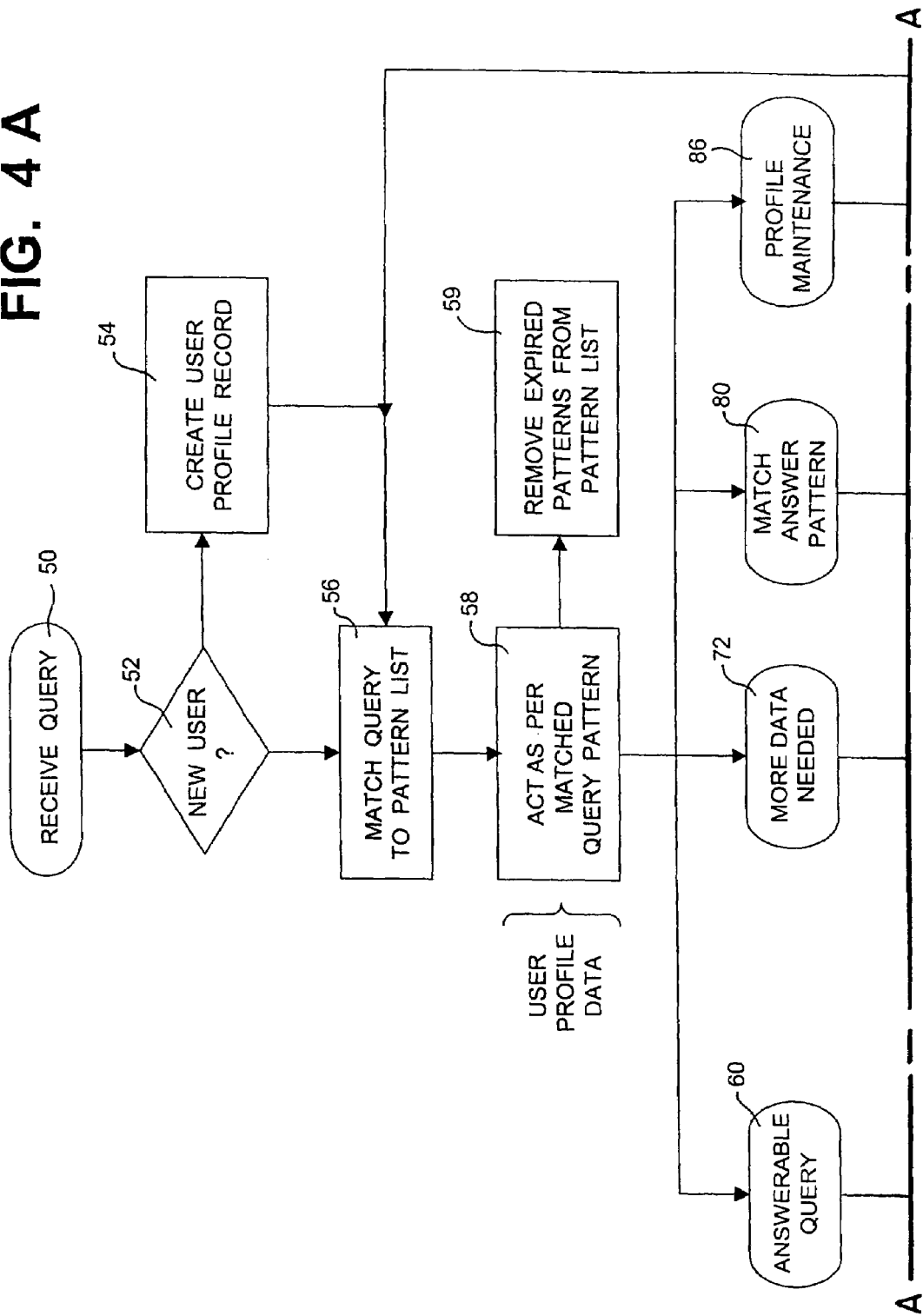
FIGS. 4A-B are a flow chart of various aspects of the operation of a message processor for use in the systems of FIGS. 1 and 2.
Figure 4B:
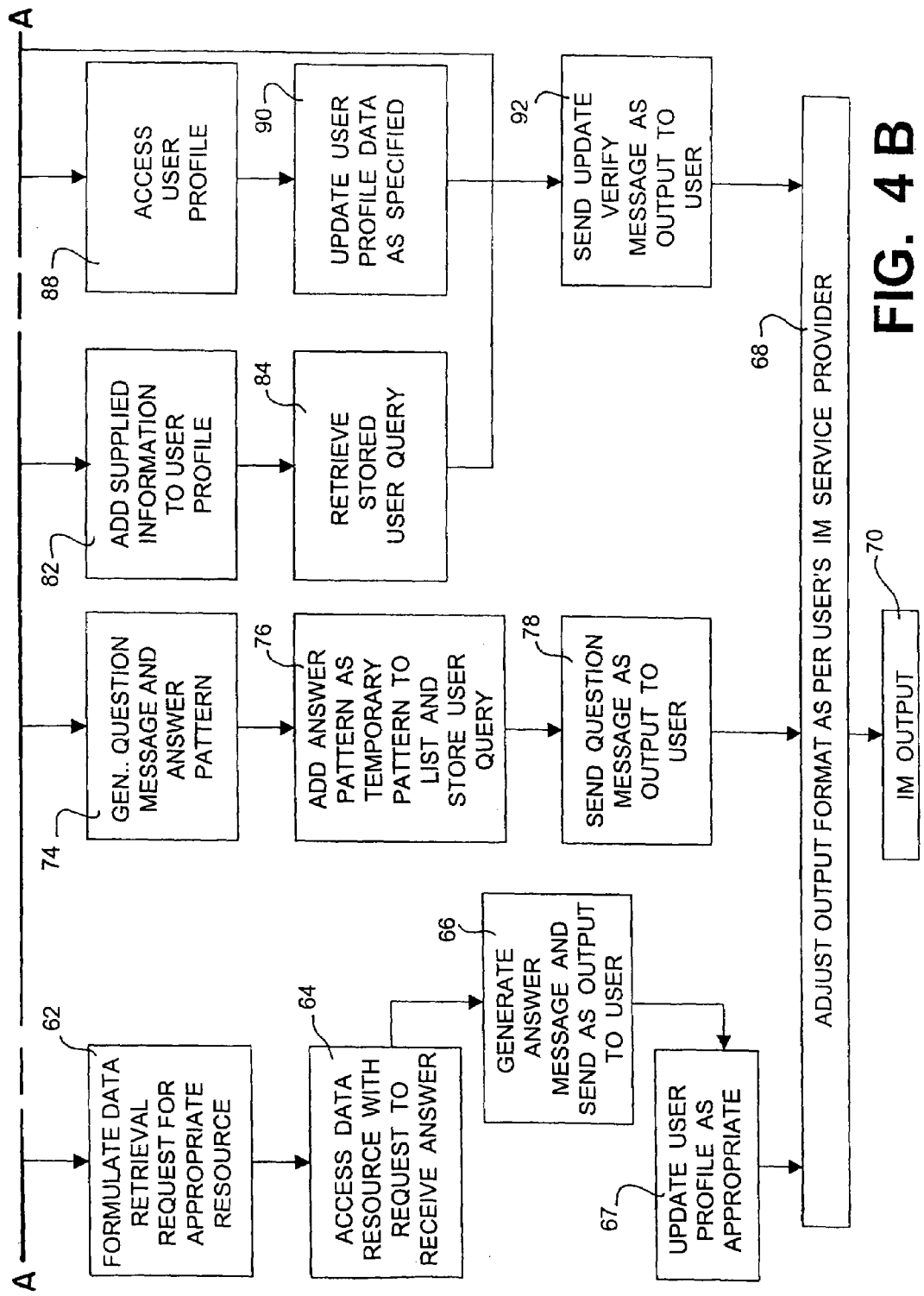

FIG. 4 illustrates four basic types of requests which can be received and acted upon. These types are exemplary in nature and it will be appreciated that other types of requests in different classifications can also be handled by adjusting the present system and method as required.

A first type of query is what can be considered to be an "answerable" query. In other words, this type of query can be answered without additional input from the user (although access to data in the user profile or another secondary source may be required). Following receipt of an answerable query (step 60) a data retrieval request is formulated as required for the appropriate data resource (step 62). If the data resource is local, the data resource is directly accessed as appropriate using the formulated request. If the data resource is remotely located, the resource request is formatted as required for the given resource and forwarded through an appropriate communication link, such as the Internet (step 64). After the answer is received or extracted from the data resource, an answer message is generated and configured to sent the user as output. (Step 66). The user profile can also be updated, as appropriate, in accordance with any new or updated information garnered from the interaction.

Because various users may be connected to the system through IM providers which support incompatible display options, a presentation layer is preferably provided for adjusting the format of output messages in accordance with knowledge of the data formatting requirements for the user's particular IM service provider. In one embodiment, the presentation layer consists of a script processing mechanism somewhat similar to script processing provided by the XML language. Each message processed by the message server is initially formatted to include all formatting options for all supported IM systems. For example, the initial output message can contain both bold text and embedded URLs even though, e.g., one IM system supports bold text but not embedded links, while a second IM system supports embedded links but not bold text. During the output processing, the presentation layer determines the target IM system and its supported capabilities and/or formatting requirements. The unsupported or excess formatting is removed and the remaining message is adjusted, as needed, to be in a format suitable for the target IM system.

The output message, properly formatted as required, is then forwarded to the user through the IM gateway 16 (step 70). Alternatively, or in addition, the output can be directed to an additional or different address or device specified by the user, either in the particular received query, in a prior query, or as a field in the user profile.

Certain queries received by the user will not be answerable without additional data. For example, a user may submit a query inquiring about "the weather" without specifying a geographic area. In the event that such a query is received, a determination is made regarding the type of data which is missing and (provided the information is not already in the user's profile) a question message soliciting this information from the user is generated (steps 72, 74).

In one embodiment, a separate subroutine is initiated during which the system assumes that the next communication from the user will be a response to the query message and the data in the response will be stored and used as appropriate. (Not shown). Preferably, however, the particular answer pattern associated with the generated questions is added as a temporary pattern to the query list and is associated with the particular user (step 76). The more-data-needed query can also stored in the user profile for later use. In this manner, and as discussed further below, a response to the generated question can be detected without requiring additional and separate data processing routines which limit the responsive actions which can be taken by the user. Finally, the question message is configured as output to the user (step 78) and forwarded through the output presentation layer and the IM gateway (steps 68, 70).

Preferably, answer patterns are added as temporary query patterns and expire within a designated period of time. Thus, a process can be initiated on a periodic basis to remove expired patterns from the pattern list (step 59). In addition, temporary patterns associated with a given user are also preferably removed when a subsequent communication from that user is received, regardless of whether the communication matches the query or not. This allows a user to abandon a query which requires more data and simply issue a new query (which will not match the temporary pattern).

By storing an answer pattern as a temporary pattern at the beginning of the query pattern list, the system can easily and quickly identify user communications which are responses to a data needed question. When a response matches an answer pattern (step 80) the information returned by the user is extracted and added to the appropriate fields in the user profile (step 82). The original user query which spawned the "more data needed question" is then retrieved from the user profile and reissued as if were just received from the user. During this second attempt, the required information can be retrieved from the user profile and the user's query executed without interruption (steps 84, 56). In the event that further secondary or additional information is required, the data solicitation procedure can repeat until the query is answerable or a failure condition is recognized.

In addition to issuing queries to request information, a user can issue requests to perform maintenance of their profile. For example, a user can request that the system add a designated number of stock shares to their profile for tracking purposes. Profile maintenance commands can be identified through general natural language processing, such as query pattern matching, or can be identified through particular introductory key words, such as "PROFILE:", which indicates that the request is a profile update and not a general informational query. When a profile maintenance request is detected (step 86) the appropriate user profile is accessed (step 88). The user profile is then updated in accordance with the user specification (step 90). Finally a message indicating the success or failure of the update can be generated and forwarded to the user (steps 92, 68, 70).

Various other types of user queries may also be received in addition to those specified in FIG. 4. Other types of requests which can be processed in accordance with the present invention include, for example, a request to control a device connected to the Internet, a request to schedule a reminder, a request to send a message to a third party by a wireless messaging service, and a request to purchase particular goods or commodities. The specific implementation details are request-type dependent. The particular techniques and interface protocols required to process these types of requests will vary according to the implementation and platform technology. Various response techniques will be known to those of skill in the art and will therefore not be discussed further herein.

As discussed previously, instant messaging services assign unique, authenticated screen names, for various compelling reasons. In accordance with the invention, this unique, authenticated screen name is used to provide interactive agents with the ability to customize their responses for each user.

Figure 5:
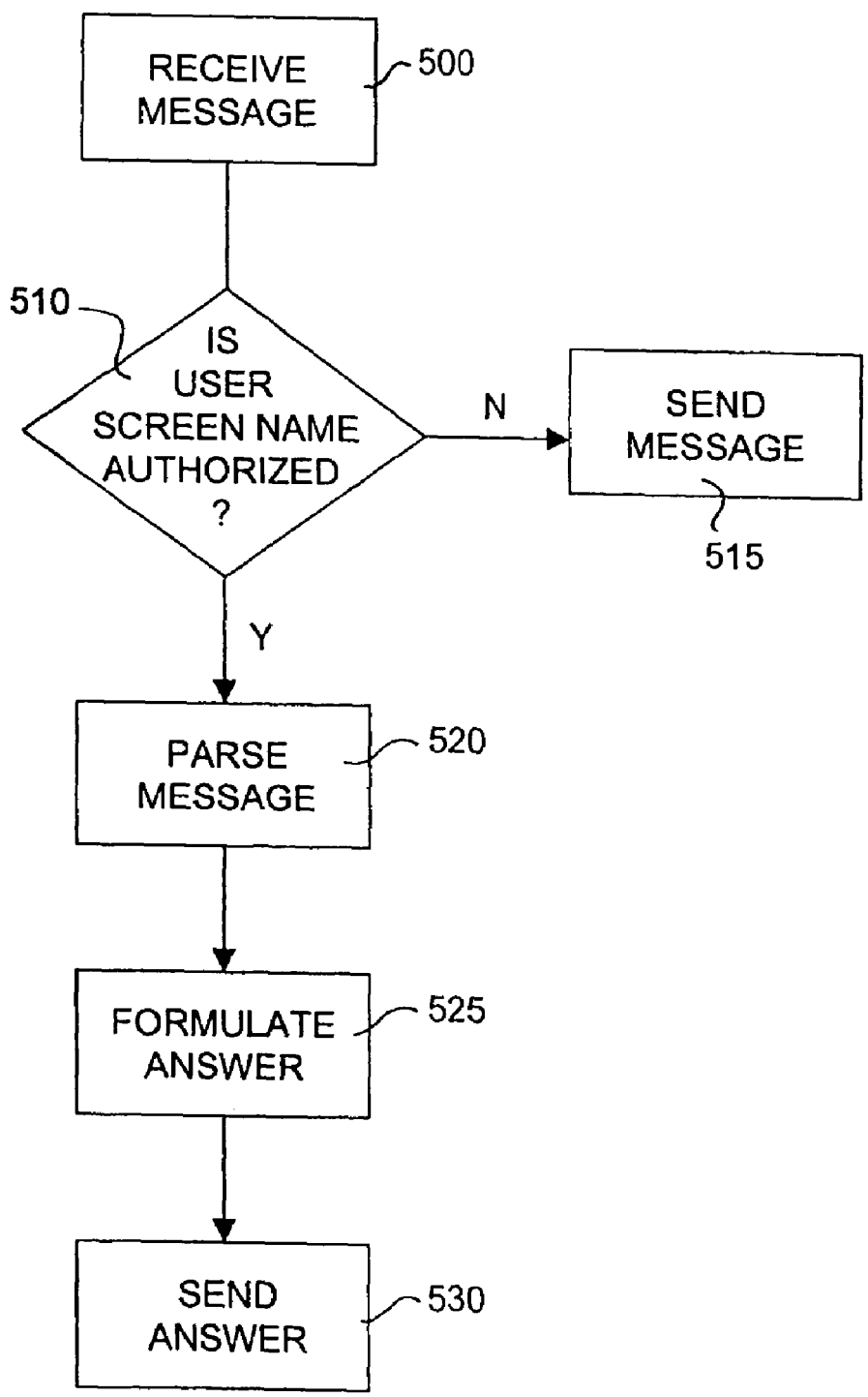
FIG. 5 is flow chart showing the general steps for deciding whether access should be granted to a restricted service.

FIG. 5 is flow chart showing the general steps for deciding whether access should be granted to a restricted service. If the service is a restricted service, so that access is to be granted to a limited set of users, the screen name is used as the basis for deciding whether access should be granted. For example, in accordance with the invention, a company may launch an interactive agent on an instant messaging service. By creating an access list of authorized employees' screen names, the company may then restrict to the interactive agent so that only their employees have access to the service. If a user sends a message, and that user's screen name is not on that access list, then the user is denied access to the interactive agent.

In accordance with a preferred embodiment (FIG. 3a now FIG. 5), a message is received from a screen name, as indicated in step 500. In alternative embodiments, the profile variables that corresponded to the screen name are also retrieved.

A check is made to determine whether the screen name is authorized to access the restricted service, as indicated in step 510. If the screen name is not authorized to access the restricted service, then a message that informs the user that access is denied is sent, as indicated in step 315. In the preferred embodiment, the message is "sorry you do not have access".

If the screen name is authorized to access the restricted service, then the message is parsed to generate a parsed message, as indicated in step 520.

Next an answer is formulated based on the parsed message and where appropriate the profile variables, as indicated in step 525. The answer is then sent to the user, as indicated in step 530.

In accordance with the preferred embodiment, it is also possible to parse the message and formulate the answer prior to checking the authorization of the screen name. However, if it is determined that the user is not authorized, then the results of the parsing and formulation must be discarded.

Figure 6:
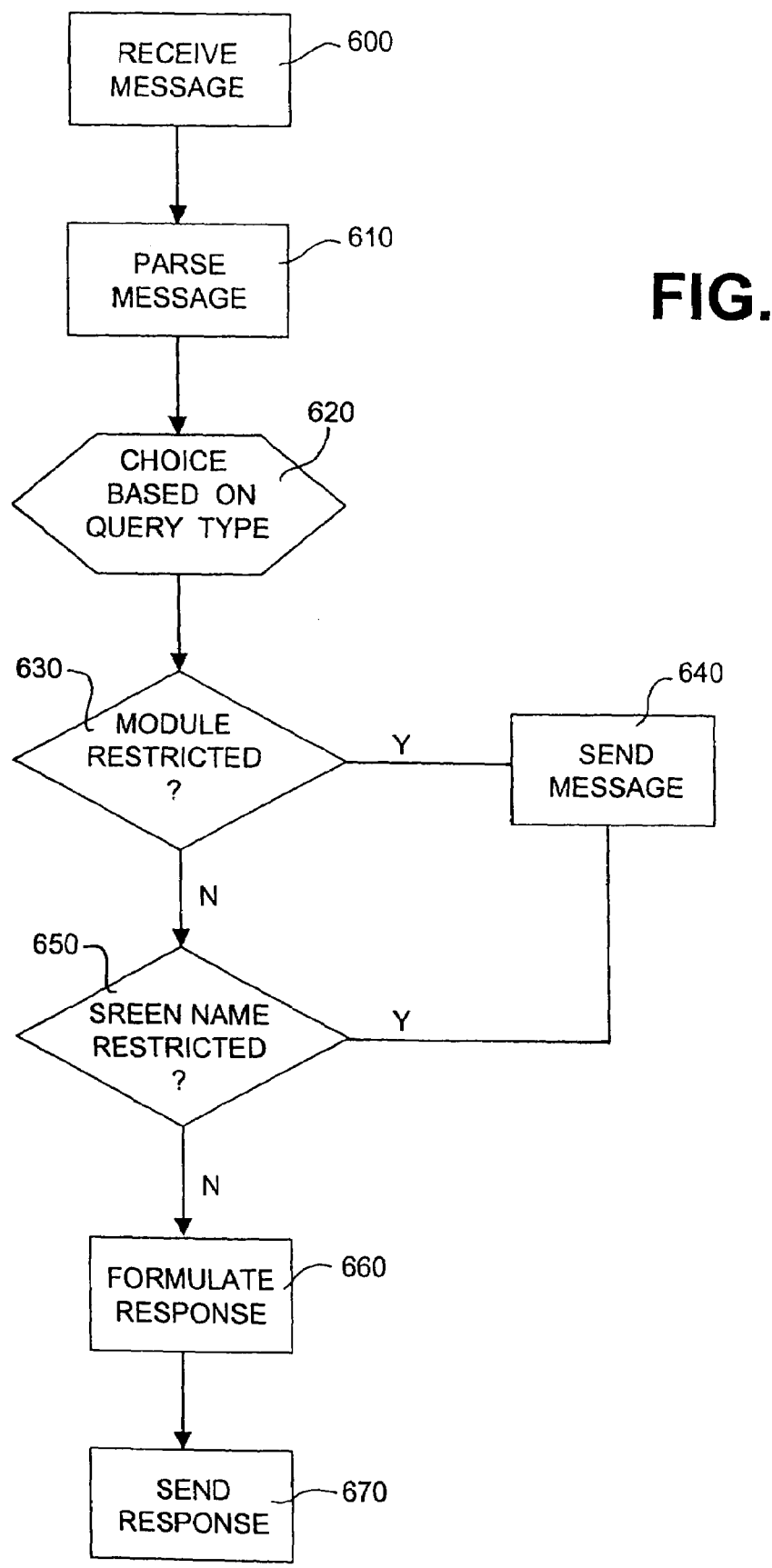
FIG. 6 is a flow chart showing the general steps for using the screen name as the basis for deciding whether access should be granted to the relevant sub-service.

FIG. 6 is a flow chart showing the general steps for using the screen name as the basis for deciding whether access should be granted to the relevant sub-service, where the service is comprised of several component sub-services, and some of those sub-services are restricted. In accordance with the preferred embodiment, prior to performing authorization of the screen name, the interactive agent must parse the query to determine which component sub-service will be used to formulate the response.

For example, a company may launch an interactive agent that is comprised of several sub-services. Some of the sub-services are unrestricted, to which any user is granted access. By using an access list, some of the sub-services are restricted. The present embodiment differs from the prior preferred embodiment shown in FIG. 5, in that the message must be parsed and the sub-service identified before access can be granted or denied.

In accordance with the present preferred embodiment, a message is received from a screen name, as indicated in step 600. In alternative embodiments, profile variables that correspond to the screen name are also retrieved.

Next, the message is parsed to generate a parsed message, as indicated in step 610. A service module that will formulate an answer for the parsed message is identified, as indicated in step 620.

A check is made to determine whether access to the identified module is restricted, as indicated in step 630. If access to the identified module is restricted, a message that informs the user that access is denied is sent, as indicated in step 640. In the preferred embodiment, the message is "sorry you do not have access".

A check is performed to determine whether the screen name has restricted access to the identified module, as indicated in step 650. If access of the screen name to the identified module is restricted, a return to step 640 occurs, where the message that informs the user that access in denied is sent.

If the screen name is authorized to access the module, then an answer is formulated based on the parsed message and where appropriate the profile variables, as indicated in step 660. The answer is then sent to the user, as indicated in step 670.

Figure 7:
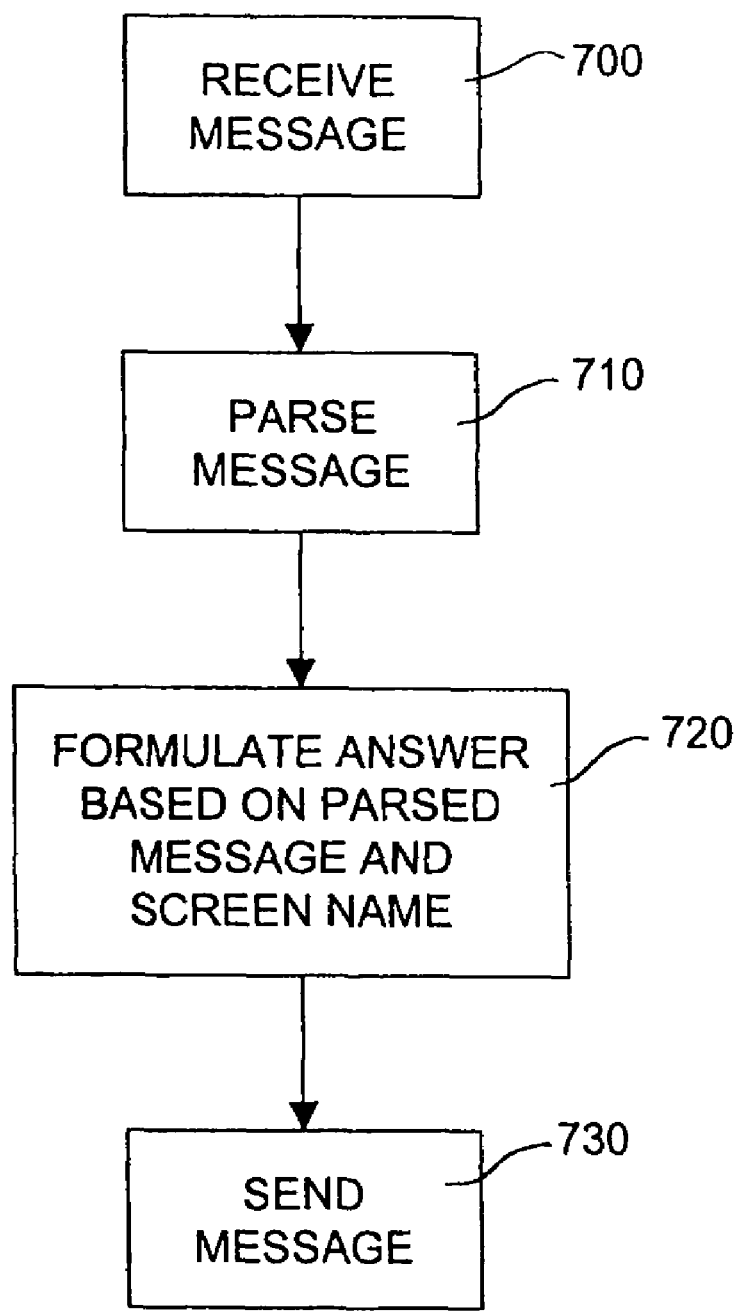
FIG. 7 is an illustration of the steps for using the screen name to formulate a response that is appropriate for the user in question.

FIG. 7 is an illustration of the steps for using the screen name to formulate a response that is appropriate for the user in question. Here, the customization encompasses more than providing or denying access to a given service or sub-service.

In an embodiment of the invention, a screen name, in addition to a user's query, is used to formulate a response when a corporate directory service is accessed. Here, a the employees of many companies are listed in a corporate directory, and access to the directory is to be restricted, so that an employee of a particular company can only retrieve information about other employees at that same company.

In an embodiment of the invention, a corporate directory 411 directory uses a relational database with a structured query language (SQL) interface. Here, the user's screen name is used in the formulation of the response. Here, the corporate directory is stored in an SQL table. The screen name is then used to look up the list of companies for which the user works. (It is possible, such as in the case of consultants, that an individual works for more than one company.) The resulting list is joined with the entire SQL table, yielding a list of employees that work for all the companies.

In the present embodiment, however, access authorization is handled much differently than in the previous preferred embodiments shown in FIG. 5 and FIG. 6. Specifically, the Corporate 411 application is not required to explicitly permit or deny access to specific users. In accordance with the present embodiment, if a user's screen name is not listed in the corporate directory, then an empty result set will be returned. Access is granted implicitly, depending on whether the SQL query returns any results.

In the exemplary embodiment discussed below, Table 1 contains sample records for employees from three companies: ActiveBuddy, Newco, and Overture. The records are maintained in accordance with the relationship:

$$\text{sql>select * from dir order by last, first;} \quad \text{(Eq. 1)}$$

1 TABLE 1 id first last screenname company 5 Stephen Jones sjones11 Newco 1 Timothy Kay timkay ActiveBuddy 6 Timothy Kay timkay Newco 2 Stephen Klein stephenk9 ActiveBuddy 9 Mindy Mane sweetmusic Overture 3 Stephen Odul sodul ActiveBuddy 4 David Smith davidsmith Newco 7 William Tell bellringer Overture In accordance with the exemplary embodiment, if an employee with the screen name "davidsmith" wishes to query the corporate directory service for employees with first name "Stephen," he might ask "What is Stephen's phone number?"

As described with respect to the prior exemplary embodiments shown in FIGS. 5 and 6, the user's screen name can be used to permit or deny access to the corporate directory service or sub-service. To determine if access is to be permitted, a simply SQL query is performed, in accordance with the following relationship:

$$\text{sql>select count(*) from dir where screenname='davidsmith'.} \quad \text{(Eq. 2)}$$

2 TABLE 2 count(*) 1

The resulting non-zero count (see Table 2), indicates that the screen name "davidsmith" is listed in the corporate directory table and indicates that this user is to be permitted access.

In accordance with the embodiments shown in FIG. 5 and FIG. 6, the next query is to then find employees that have "Stephen." as their first name. This is performed in accordance with the relationship:

$$\text{sql>select company, first, last from dir,} \quad \text{(Eq. 3)}$$

where first='stephen' order by last, first;

3 TABLE 3 company first last Newco Stephen Jones ActiveBuddy Stephen Klein ActiveBuddy Stephen Odul The result illustrated in Table 3 reveals that the prior embodiments shown in FIG. 5 and FIG. 6 do not properly restrict the corporate directory service. The user with screen name "davidsmith" should see only employees who work for his company, namely Newco, but instead he sees employee listings from both Newco and ActiveBuddy.

Turning to FIG. 7, the present embodiment restricts the service using a different mechanism than the embodiments disclosed in FIG. 5 and FIG. 6. Specifically, in addition to the user's query, the screen name must be used to formulate the correct response that is restricted in the desired manner. This is accomplished by, using the user's screen name to determine which company(s) the user works. For each company retrieved in the first step, the database is then queried for rows that (i) indicate the matching company; and (ii) satisfy the user's query. This is illustrated as follows. First the service determines for which company the user works in accordance with the following relationship:

$$\text{sql>select company from dir where screenname='davidsmith';} \quad \text{(Eq. 4)}$$

4 TABLE 4 company Newco

Next, the name of the user's company, in addition to the user's query, are used to formulate the response, in accordance with the following relationship:

$$\text{sql>select company, first, last from dir} \quad \text{(Eq. 5)}$$

where company='Newco' and first='Stephen';

5 TABLE 5 company first last Newco Stephen Jones

As a result, the correct response, which in certain embodiments is formulated, "Stephen Jones (Newco)." Here, the user's screen name, in addition to the user's query, is used to formulate the response.

As will be appreciated by those of skill in the art, it is possible for an individual to work for more than one company. Another employee, with the screen name "timkay," could be listed in the corporate directory table twice (see Table 1), i.e., for two different companies, ActiveBuddy and Newco. In accordance with the present embodiment, as long as the second step is iterated once for each company, the proper response is still formulated.

$$\text{sql>select company from dir where screenname='timkay'.} \quad \text{(Eq. 6)}$$

6 TABLE 6 company ActiveBuddy Newco

In accordance with the present embodiment, the first iteration locates all employees with the first name "Stephen" that work for ActiveBuddy. This is performed in accordance with the relationship:

$$\text{sql>select company, first, last from dir,} \quad \text{(Eq. 7)}$$

where company='ActiveBuddy' and first='Stephen';

7 TABLE 7 company first last ActiveBuddy Stephen Klein ActiveBuddy Stephen Odul

The second iteration finds all employees with the first name "Stephen" that work for Newco. This is performed in accordance with the relationship:

$$\text{sql>select company, first, last from dir.} \quad \text{(Eq. 8)}$$

where company='Newco' and first='Stephen';

8 TABLE 8 company first last Newco Stephen Jones

The response is then formatted and sent to the user. In certain embodiments, the response is "Stephen Klein (ActiveBuddy), Stephen Odul (ActiveBuddy), and Stephen Jones (Newco).". In the preferred embodiment, the corporate directory 411 service is performed in a different manner. Specifically, a more complex SQL query, such as a self-join is used to formulate and retrieve the answer in a single SQL query, in accordance with the following relationship:

$$\text{sql>select v.company, v.first, v.last from dir u, dir v,} \quad \text{(Eq. 9)}$$

where u.screenname='davidsmith', u.company=v.company, and v.first='Stephen';

9 TABLE 9 company first last Newco Stephen Jones $$\text{sql>select v.company, v.first, v.last from dir u, dir v,} \quad \text{(Eq. 10)}$$

where u.screenname='timkay', u.company=v.company, and v.first='Stephen'.

10 TABLE 10 company first last ActiveBuddy Stephen Klein ActiveBuddy Stephen Odul Newco Stephen Jones In accordance with the present preferred embodiment, the self-join query includes the user's screen name as a fullfledged participant in the query.

Referring to FIG. 7, the preferred embodiment is implemented when a message is received from a screen name, as indicated in step 700. In alternative embodiments, the profile variables that correspond to the screen name are also retrieved.

The message is then parsed to yield a parsed message, as indicated in step 710. An answer is then formulated using the parsed message, the screen name and where appropriate the profile, as indicated in step 720. The answer is then sent to the user, as indicated in step 730.

In accordance with the preferred embodiment, when the response that is sent to the user is formulated, the interactive agent incorporates all available data that is uniquely identified by the screen name.

To gain access to the sibling services, the interactive agent servers must be granted a trust relationship with the sibling services. Hence, the provider of the IM and sibling services grant access to the sibling services databases without requiring a password. In doing so, the service provider is trusting the interactive agent to properly handle the access privileges.

Such a trust relationship is possible because of the very nature of instant messaging. For a user to send a message from a given screen name, they must be pre-authenticated by the instant messaging service. That service authentication mechanism is the same mechanism (and the same screen name and password) that is used by the sibling services. Therefore, the fact that a message is received from the screen name proves in itself that the user has access to the data in question.

In accordance with the preferred embodiment, once the trust relationship is established, the interactive agent would have access to user information stored in the sibling services. The interactive agent can then manipulate the data stored in sibling services on behalf of the user, since the data belongs to that user.

In certain embodiments, Personal Bots are used to store all of the user's personal data in the interactive agent user profile. In accordance with the present embodiment, it is possible to increase the synergy of the personal bot with the method of the invention, if the interactive agent granting access to the user's personal data was previously stored in the sibling services. In this case, the user would then have an integrated calendar, for example, that is manipulateable either through the previously extant web interface, as well as through the personal bot, by issuing statements such as "I'm having lunch with Bob Smith on Tuesday."

Many institutions, including banks, brokerages, supermarkets, online retail sites, etc., keep track of customers. For each customer, the institution has a customer record that contains customer information, such as name, address, birth date, social security number, account balances, credit cards, and personal preferences.

An institution often assigns a user an account name and a password (also called a PIN). Using their account name and password, a customer can access and modify some aspects of their own customer record, such as querying their bank balance, updating their preferred credit card, or changing personal preferences.

Often the accounts are accessed via a modem or via the Internet, using either a browser or proprietary software. In the first case, the user runs some software and enters the account name and password. The software dials the service, logs the user in, and grants access to some part of the customer record for access or modification. The user then interacts with the software to access or modify their record.

In the second case, the user starts the browser software, enters the appropriate URL and possibly clicks on an appropriate hyperlink. The user then enters the account and password, and is granted access to some portion of the customer record for access or maintenance. The user then interacts with the web page to access or modify their record.

Instant messaging services comprise another method for companies to offer their customers access to customer records. To provide access via instant messaging, the company builds an interactive agent that does two things. First, the interactive agent interacts with the users. Second, at the request of the users, the interactive agent accesses and modifies the users' records.

There are security issues that arise when accessing companies record in this manner. Any given user must be granted access to only their user records and must be prevented from accessing the records of other users. To this end, the interactive agent must be able to ascertain the identity of any given user. The problem here is that a bank knows a user by name, account number, address, etc., and the instant messaging service (and hence the interactive agent) knows the user authoritatively only by their screen name. Without taking any action, it is not possible to know authoritatively which accounts and screen names correspond to each other.

Figure 8:
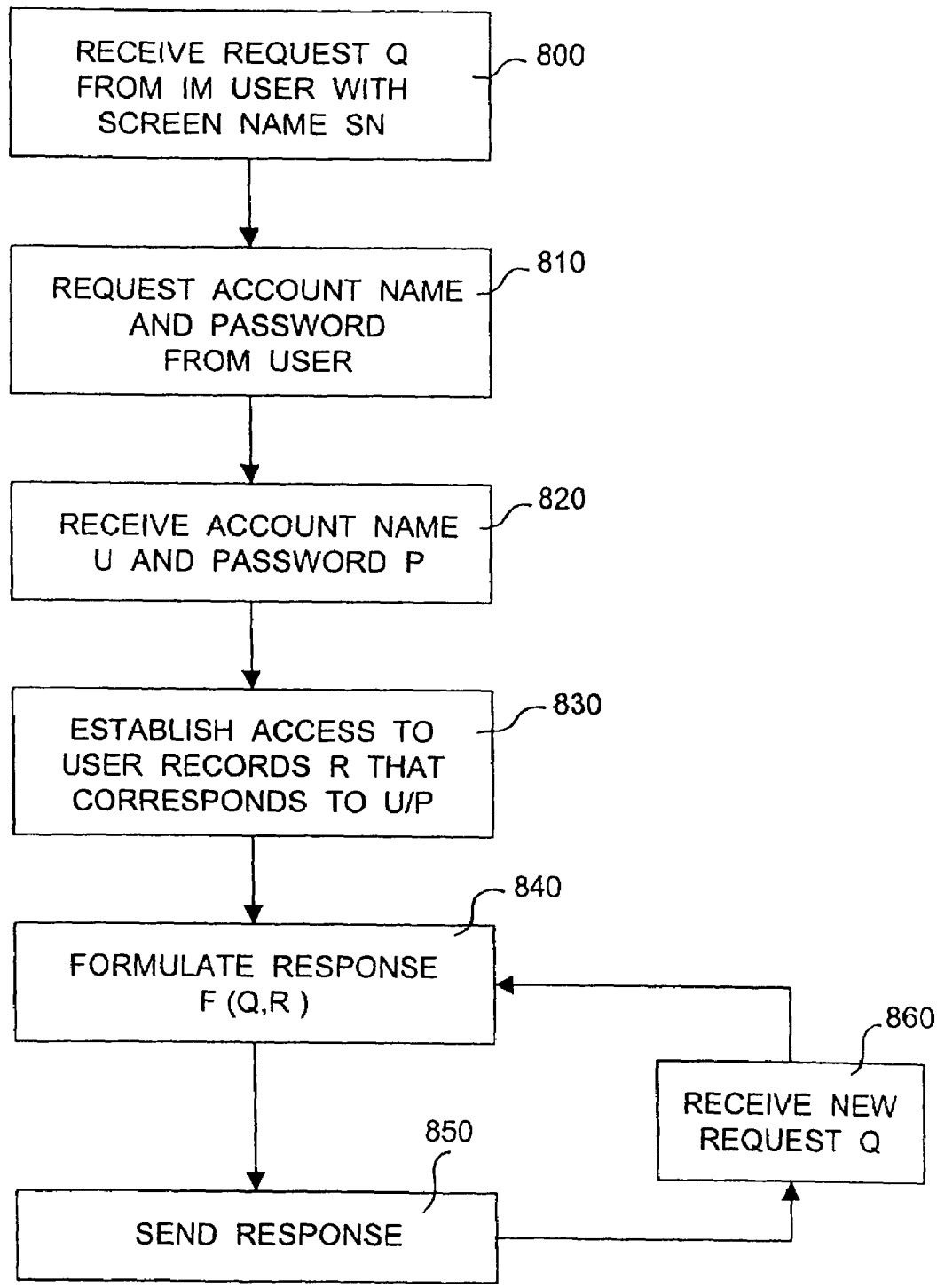
FIG. 8 is a flow chart that shows a solution to the problem of identifying users of an interactive agent.

FIG. 8 is a flow chart that shows a solution to the problem of identifying users of an interactive agent. As shown therein, the interactive agent receives a request from an IM user having a particular screen name, as indicated in step 800. A request for the user's account name and password is made by the interactive agent, as indicated in step 810. The user's account name and password are then received by the interactive agent, as indicated in step 820.

The interactive agent then establishes access to the appropriate user records, as indicated in step 830. Having established access to the appropriate user records, the interactive agent then formulates a response, as indicated in step 840. The response to the initial query is then transmitted (step 850), and any additional queries are processed, as shown in step 860.

The interactive agent can then access the appropriate user records on behalf of the user. This solution, however, is not preferred. Basically, the user previously logged into the instant messaging service, so the service, other users, and interactive agents can be confident that messages sent from the user's screen name are in fact from that user. It is therefore redundant for the user to have to repeatedly identify himself using an additional screen name and password.

Figure 9:
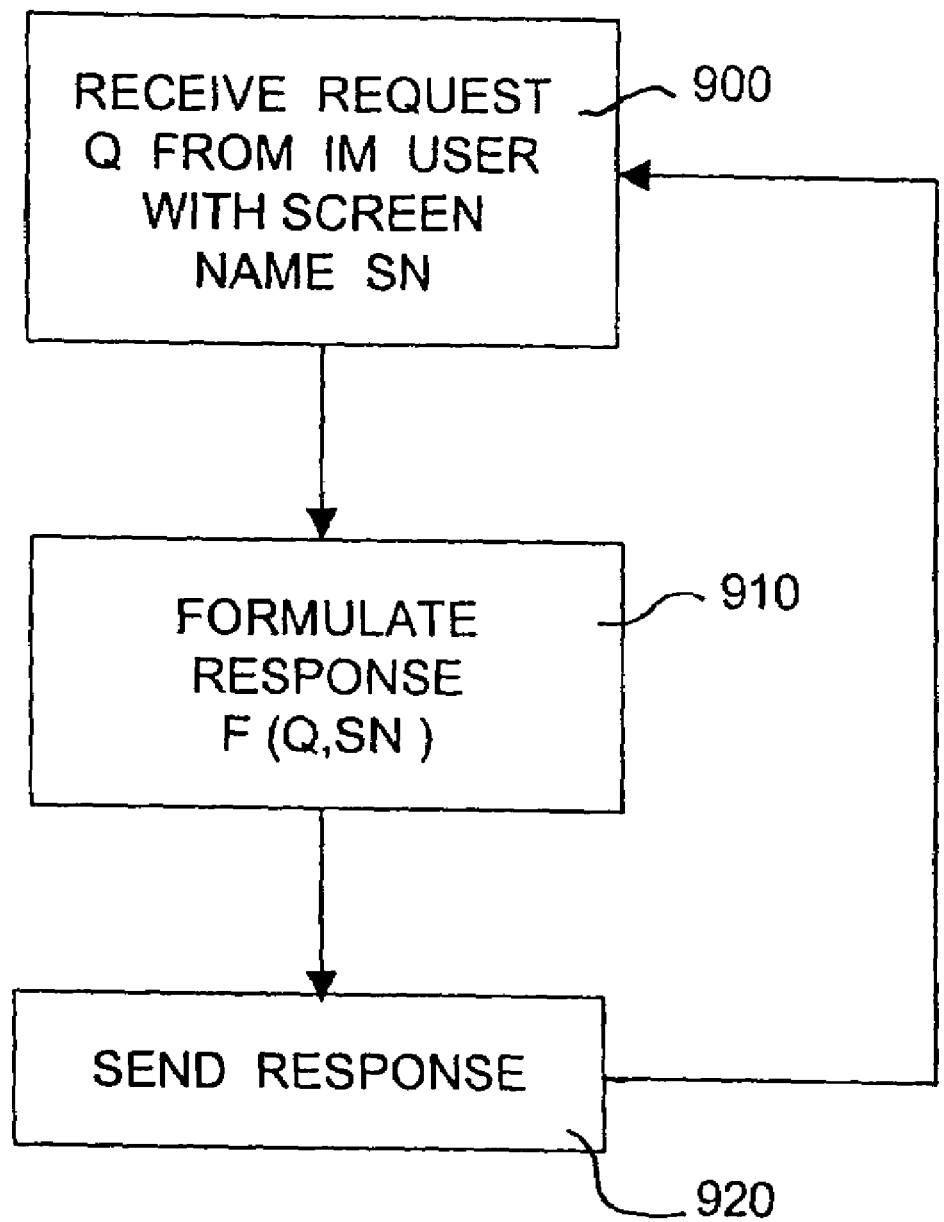
FIGS. 9(*a*) and 9(*b*) are flow chart that illustrate how a user can access their record without needing to use their account name and password.
Figure 9:
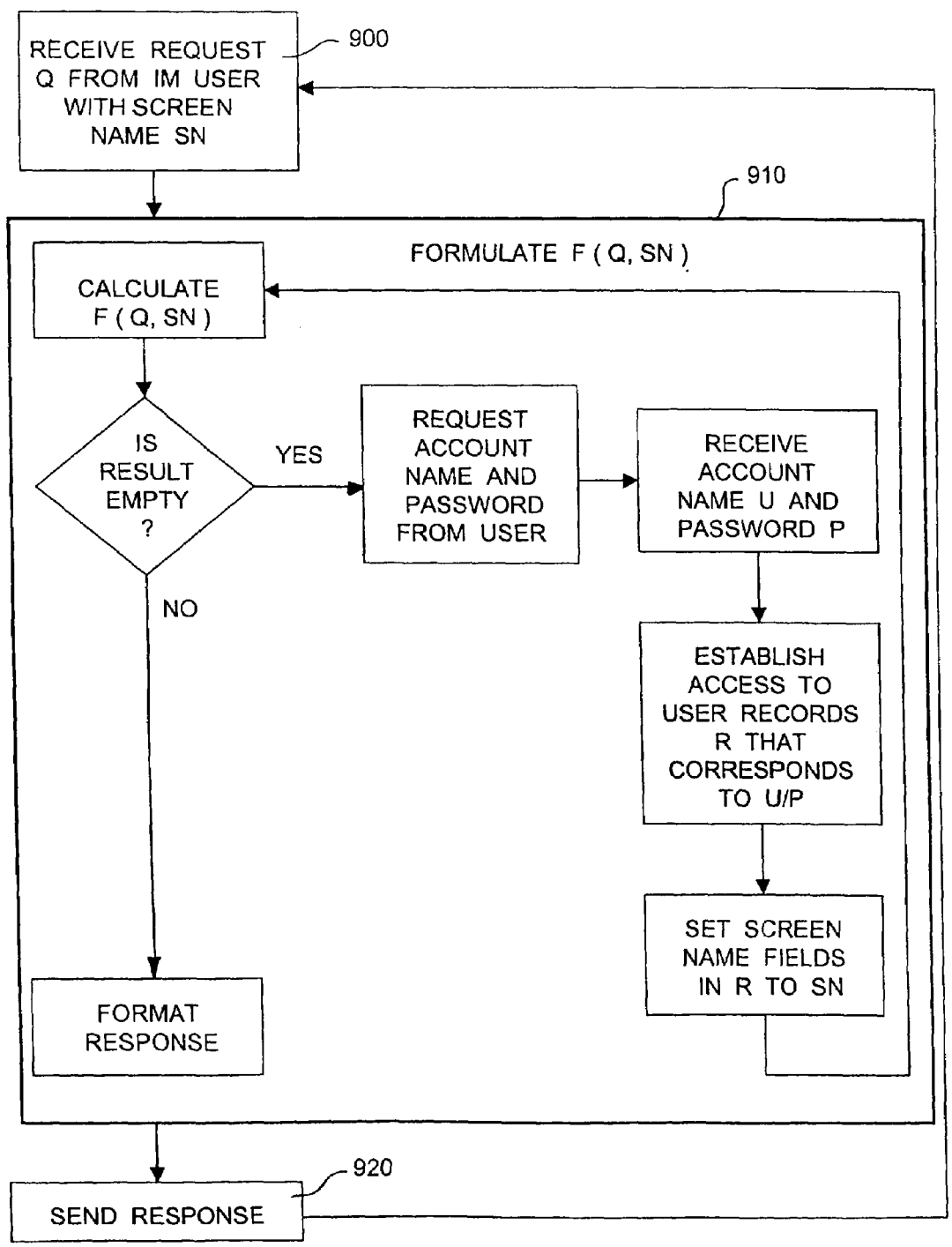

In the preferred embodiment, a new field is added to those user records that contain the user's screen name to identify the relevant user. Here, the user (or institution) then enters the user's screen name into the new field in the user record. As a result, when the user wishes to access their record, they can do so without needing to use their account name and password, as illustrated by FIG. 9(*a*). As shown therein, the interactive agent receives a request from the user having a specific screen name, as indicated in step 900. The response is formulated using the request from the user (see FIG. 9(*b*)), as indicated in step 910. The response is then sent to the user, as indicated in step 920, and a return to step 900 then occurs, where in accordance with the preferred embodiment the prior steps are repeated.

Figure 10:
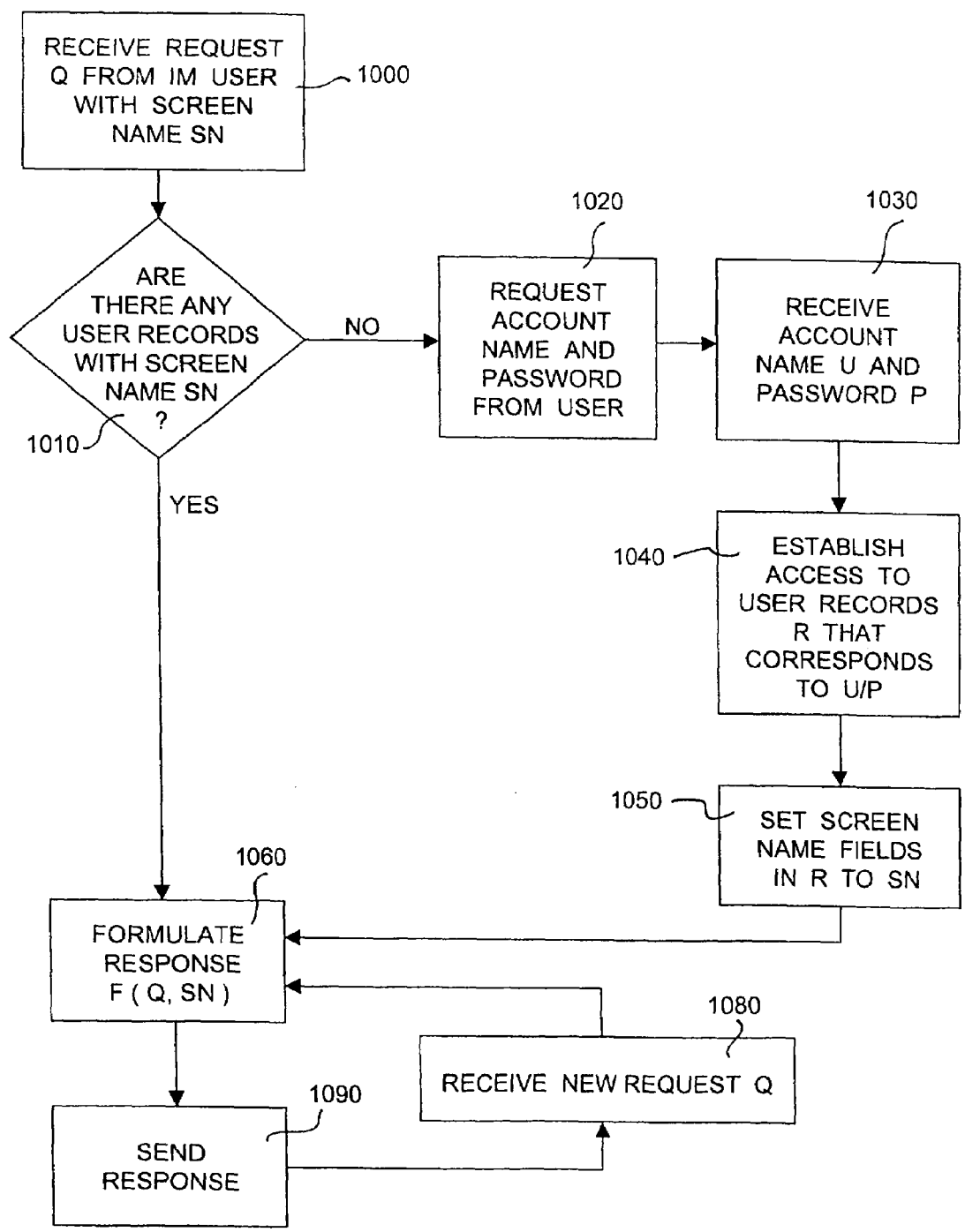
FIG. 10 shows the steps for an interactive agent to use account name and password information to modify a user's record.
Figure 11:
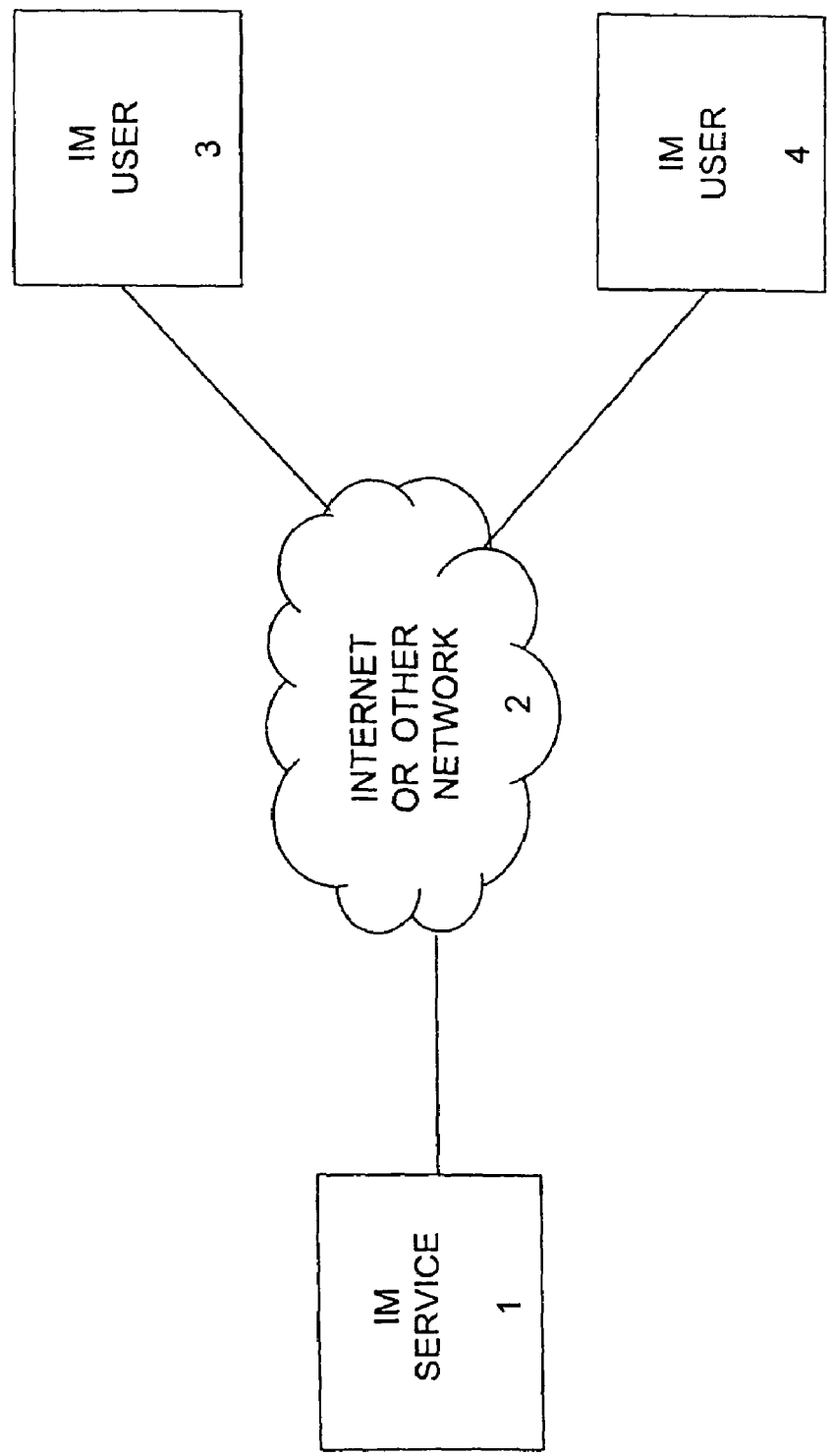
FIG. 11 is a schematic block diagram of multiple IM services connected to the Internet.

In an alternative embodiment the user provides his account name and password to the interactive agent, but only once. Turning to FIG. 10, the interactive agent uses this information to modify the user record. The interactive agent knows the screen name of the user, and enters it in the screen name field in the user record. With further reference to FIG. 10, the alternative embodiment comprises sending a request from an IM user that has a specific screen name to the interactive agent, as indicated in step 1000.

A check is then made by the interactive agent to determine whether there are any user records that have the specific screen name, as indicated in step 1010. If the interactive agent determines that there are no user records that have the specific screen name, then the interactive agent requests the user to provide his account name and password, as indicated in step 1020. The account name and password is received by the interactive agent, as indicated in step 1030.

The interactive agent then establishes access to records that correspond to the user's screen name and password, as indicated in step 1040. The user's screen name is stored into a screen name field of the accessed record, as indicated in step 1050.

At this time, the interactive agent has access to the appropriate records at the institution. As a result, the interactive agent proceed to formulate a response based on the original query, as indicated in step 1060. The response is then sent to the user, as indicated in step 1070, and a return to step 1060 then occurs, where in accordance with the present embodiment the prior steps are repeated.

In accordance with the preferred embodiment, a company can build an interactive agent that appears on an IM service as a screen name. For example, Wells Fargo Bank might create an interactive agent named "Wells Fargo Online" on the AOL Instant Messaging (AIM) service. The interactive agent would have access to bank records. In the case where the bank asks for the user's screen name when the account is opened, and stores the screen name in the user's record, along with other information on the account application form, an AIM user may interact with Wells Fargo Online to access or modify their banking record. In accordance with the present preferred embodiment, this is accomplished using the screen name that is stored in the user's account record, without the need to provide any account information, user names, or passwords to the interactive agent. Given that the user talks to Wells Fargo Online using the stored screen name, the user is provided with all access permission that is needed to access and modify their records.

Many Internet portal services provide suites of applications, such as email, calendar, address book, etc., in addition to instant messaging service. The largest three portals are AOL.™., Microsoft.®™., and Yahoo!.®™. Typically, a user registers at such portal services and is issued an account name and password. The single account and password provides the user with access to the different applications provided by the portal.

For example, a user might type the URL "http://my.yahoo.com/" into their browser. Upon doing so, the user will see a button that reads "Sign Up Now!" Upon signing up, the user creates their account, and sets up their "My Yahoo!.®™. preferences," which include many personalization choices, such as a zip-code to display the local weather report, their birth date such that their horoscope is displayed, their choice of news categories, or their stock portfolio.

At some point in the future, the user may decide to start using "Yahoo!.®™. Calendar" by visiting the URL "http://calendar.yahoo.com/", Yahoo!.®™. Addresses at "http://address.yahoo.com/", or Yahoo!.®™. Mail at "http://mail.yahoo.com/". in each environment, the user can use the same account and password.

In addition, the user can download the Yahoo!.®™. Messenger client application to participate in the Yahoo!.®™. Messenger instant messaging service. As before, the same account and password may be used to gain access to the messaging service.

The same collection of applications are available to users at the AOL site and at the Microsoft.®™. MSN site. A user can sign-up for an account and password, and then use applications including calendar, address book, email, portfolio, news, and instant messaging.

An interactive agent, similar to SmarterChild.™., can be placed on any of the instant messaging services, and can access the personalization and event data. By way of the interactive agent, a user can send requests such as: (i) "What are today's appointments?", (ii) "Lunch with Dave at 1:15 on Wed."; (iii) "Remind me to call my mom back in 20 minutes"; (iv) "Tell Tom Smith to call me at his convenience"; (v) "What i, my horoscope?"; (vi) "Add IBM to my portfolio"; and (vii) "Tell me when IBM hits 100, or the like.

Interactive Agents such as SmarterChild.™. and Agent Reuters.™. already handle requests like these. However, these interactive agents stand alone, in that they keep track of each user's personalization data and event data in a database that is specific to the interactive agent. When a user first requests his horoscope, the stand-alone interactive agent must ask the user for his birth date (or zodiac sign), even if that user previously provided that information to other related portal applications.

A further embodiment of the invention provides for communication between an interactive agent and other existing portal applications. In preferred embodiments where an agent such as SmarterChild.™. is used, the personalization and event data, such as user zip-code, calendar events, stock portfolio, etc., is shared between the related portal applications and the interactive agent. When the information is shared, the user is required to provide the information to aggregate related portal services only once. If information is ever provided to any of the related portal services, then the interactive agent can make use of that information when needed.

In exemplary embodiments, a My Yahoo!.®™. user sets up a stock portfolio and personalizes his weather report and daily horoscope. At a later date, the user starts using a special version of SmarterChild.™. that shares information with the related portal applications. When the user asks for his portfolio, weather report, or horoscope, etc., the interactive agent provides the requested information immediately without first having to ask the user to specify a list of stocks, a zip-code, or a birth date. This is possible because the interactive agent can obtain the needed data by querying the related services.

In the preferred embodiments of the interactive agent, there is a trust relationship between the interactive agent and the related portal services. This trust relationship is established without compromising security because the IM service uses the same accounts and passwords as the related portal services. Here, the interactive agent receives requests from users of the IM service. Along with the request, the service provides the sender's screen name. By its very nature, the sender in an IM session is authenticated. The interactive agent can only receive messages from users who have authenticated themselves with the IM service.

As long as the interactive agent is trustworthy, from the perspective of the related portal services (perhaps deployed by the portal itself), the interactive agent can make trusted requests to the related portal services to retrieve personalization data, without needing a password, and without compromising security.

More specifically, if the interactive agent does not request private data inappropriately, then it means that the interactive agent is trusted by the related portal services. It is easy to build an interactive agent that compromises security and, therefore is not trustworthy. For example if an interactive agent was programmed to answer questions such as "What is timkay's birth date?", or in the worst case scenario "What is timkay's password?", then the interactive agent would make an inappropriate request to the related portal services to ascertain timkay's birth date or password. The interactive agent would then present the inappropriate request to the user that made the request. If this interactive agent were trusted, then private information would be inappropriately disseminated.

It is also easy to construct an interactive agent that is indeed trustworthy. An interactive agent is trustworthy in one of two ways. The interactive agent is trustworthy if: on behalf of user X, the interactive agent requests personalization and event data from the related services only for user X, an/or if the interactive agent optionally requests personalization data and event data from related services for users other than user X, but only such data as is marked for public consumption, or marked in some other manner to indicate that user X is allowed access to the particular data in question.

Put differently, user timkay may only request data from user timkay's own data record and user timkay may also request information from other users' records, as long as the particular data items are marked either for public consumption, or marked to indicate that timkay is allowed such access.

For example, Yahoo!.®™. Calendar permits the owner of data to mark events as either private, busy, or public. If an event is marked private, then only the owner of the data may access the event. If the data is marked busy, then only the owner may access the event in its entirety. However, other users may access the fact that the owner of the data is busy during the time span of the event. If the event is marked public, then other users may access the event information in its entirety.

In accordance with the present embodiment, additional access restrictions may also apply. For example, irrespective of the private/busy/public status of an event, only the owner of the event may actually change it. In addition, in some cases, such as group calendars, some events may be marked as accessible only by a certain group of users.

In accordance with the present embodiment, an interactive agent is considered trustworthy if it respects such data access policies for the related portal services. The interactive agent can be programmed to respect such policies in two ways. In the first technique, the interactive agent is constructed such that it never delivers requested information inappropriately. In the second technique, the related portal services provide an API to the interactive agent that enforce the data access policies.

In the preferred embodiment, the two techniques for ensuring that the interactive agent interactive agent respects data access policies for the related portal services are combined to provide a failsafe mechanism. Naturally, the inter active agent is first only ever presented with information that is appropriate for the requesting user to see. Also, whenever the interactive agent requests data from related portal services, in addition to the request itself, it must provide the screen name of the user for whom the request is being made. The API of the related portal services can then verify that such a request is legitimate. The preferred embodiment thus prevents the inappropriate dissemination of private data even if there is a programming error in the construction of the interactive agent.

It must be noted that the IM service itself is a related portal service. A large collection of information is stored by the IM service (preferences, contact lists, and the like), and in accordance with the preferred embodiments such information should be subject to the same trusted access by an interactive agent in much the same manner as other related portal services.

Considering an IM service as a related portal service makes way for an interactive agent to possibly help a user with many tasks, such as maintaining a contact list, sending broadcast messages, setting preferences, and the like.

Various different programmable computer hardware platforms can be used to implement the several aspects of the present invention. In a most preferred embodiment, the various components, such as message routers, dispatcher, query response servers, etc., are implemented on one or more computer systems which are substantially identical at the hardware and operating system level. This simplifies interactivity between the various systems and makes it simpler to port functionality from one computer to another to distribute the workload in accordance with, e.g., the number of computer systems available. The computers should be connectable to each other, for example, by means of 100Base-T Ethernet interfaces and corresponding 100Base-T Ethernet switches. At least one of the computers is connected to the data network. In the preferred Internet implementation, the connection is through a firewall and via a 100Base-T connection provided by a data center. In the most preferred implementation, each computer contains an a Intel L440GX+motherboard, two Pentium III processors, 512 MB RAM, two Seagate 9 GB disk drives, and operates using the Unix compatible Linux operating system. As will be appreciated, the specific hardware utilized can be varied in accordance with need, required capacity, and the preferred programming and operating environment, as well as in response to other factors.

The invention has been particularly shown and described with reference to the preferred embodiments thereof. It will be understood by those of skill in the art that various changes and additions to the method and system described above can be made without departing from the spirit and scope of the invention.

What is claimed is:

1. A method for interactively responding to a message from a user who is logged on to an instant messaging network, comprising the steps of:

designating a screen-name to a message processor, the screen-name being unique on the instant messaging network;

using the instant messaging network to advise the user of the presence of the message processor on the instant messaging network;

receiving through the instant messaging network the message from the user which is addressed to the screen-name assigned to the message processor using an instant messaging protocol;

parsing the message to extract a request;

evaluating the request in the message processor;

generating an output message on the basis of the evaluated request; and sending the output message to the user via the instant messaging network.

2. The method of claim 1, wherein the output message is sent to the user through the instant messaging network in the instant messaging protocol.

3. The method of claim 1, wherein the step of evaluating the request comprises passing the request to a query response server and receiving the answer from the query response server.

4. The method of claim 3, further comprising the steps of accessing a profile associated with the user from a profile database and making at least a portion of the accessed profile available to the query response server.

5. The method of claim 4, further comprising the steps of, upon, if no profile is available:
creating a profile associated with the user; and
storing the profile in the profile database.

6. The method of claim 5, wherein the step of creating comprises the steps of soliciting profile information from the user and storing profile information provided by the user in the profile.

7. The method of claim 6, wherein the step of soliciting comprises sending the user a cross-reference message in the instant messaging protocol directing the user to a web page configured to receive user input.

8. The method of claim 7, wherein the cross-reference message includes an embedded URL, the URL containing a key associated with the web page.

9. The method of claim 3, further comprising the steps of:
receiving a notification from the query response server requesting additional data;
soliciting the requested additional data from the user, upon receipt of the additional data from the user,
making the received additional data available to the query response server.

10. The method of claim 9, further comprising the step of saving the received additional data in a profile associated with the user.

11. The method of claim 3, further comprising the steps of:
receiving a notification from the query response server requesting additional data;
accessing a profile associated with the user;
extracting the requested additional data from the user; and
making the additional data available to the query response server.

12. The method of claim 11, further comprising the steps of, in the event that the requested additional data is not in the accessed profile: soliciting the requested additional data from the user; and saving the additional data in the profile.

13. The method of claim 1, including the additional steps of:
generating a new access key;
creating a secret URL including the new access key;
associating the secret URL with a selected web page; and
sending the secret URL to the first user in a message using the instant messaging protocol.

14. The method of claim 13, further comprising the steps of:
receiving an access request from a second user using a hyper-text transfer protocol, the access request including a designated URL;
parsing the designated URL to extract a received access key;
identifying a designated web page associated with the received access key; and
allowing access by the second user to the designated web page.

15. The method of claim 14, wherein the first user and the second user are the same.

16. The method of claim 14, wherein the selected web page and the designated web page are the same.

17. The method of claim 14, wherein the association between the new access key and the selected web page is valid only for a predetermined period of time.

18. The method of claim 14, further comprising the step of invalidating the association between the new access key and the selected web page when the designated web page is the selected web page.

19. The method of claim 14, further comprising
the step of storing at least a portion of the secret URL in a profile associated with the first user, the portion including the new access key;
the step of identifying comprising accessing a user profile associated with the second user;
the step of allowing access comprising access by the second user to the designated web page only if the received access key is in the user profile associated with the second user.

20. The method of claim 14, further comprising the steps of:
storing the association between the new access key and the selected web page in a reference table;
the step of identifying comprising accessing the reference table to retrieve the designated web page associated with the received access key.

21. The method of claim 20, further comprising the steps of:
associating the first user with the new access key;
the step of allowing access comprising allowing access by the second user to the designated web page only if the second user is associated with the received access key.

22. A method for interactively responding to a user sending a message through an instant messaging network to which he is logged on, comprising the steps of:
designating a screen-name to a message processor, the screen-name being unique on the instant messaging network;
using an instant messaging protocol, receiving through the instant messaging network the message from the user which has been addressed to the screen-name assigned to the message processor, the message including a request;
parsing the message to extract the request;
evaluating the request to identify at least one designated action suitable for fulfilling request;
performing the at least one designated action;
generating an output message containing results of the performance of the designated action; and
sending the output message to the user via the instant messaging network.

23. The method of claim 22, wherein the output message is sent to the user through the instant messaging network in the instant messaging protocol.

24. The method of claim 22, wherein, in the event that the request is a query for information:
the at least one designated action comprises passing the query to a query response server; and
the results comprise an answer received from the query response server.

25. The method of claim 22, further comprising the steps of:
parsing the message to extract a user ID;
accessing a profile associated with the user ID, the profile containing information; and
making at least some of the information in the accessed profile available for use during at least one of the evaluating and performing steps.

26. The method of claim 25, wherein, in the event that the request is a request for profile maintenance, the at least one designated action comprises accessing a user profile associated with the user and updating the user profile as specified in the request.

27. The method of claim 25, wherein the results comprise an indication regarding the success of the profile update.

28. The method of claim 25, wherein the step of evaluating comprises:
   determining if secondary information is required to fulfill the request; and
   accessing the user profile to retrieve the secondary information.

29. The method of claim 28, wherein the step of evaluating further comprises, in the event that the secondary information is not in the user profile, soliciting the secondary information from the user.

30. The method of claim 29, further comprising the step of, upon receipt of the secondary information, saving the secondary information in the profile.

31. A system for interactively responding to a message from a user sent through an instant messaging network, comprising:
   a message processor connected to the instant messaging network; the message processor configured to:
   receive a message sent from the user in an instant messaging protocol;
   parse the message to extract a request;
   evaluate the request in the message processor;
   generate an output message on the basis of the evaluated request; and
   send the output message to the user via the instant messaging network.

32. The system of claim 31, wherein the message processor is further configured to send the output message to the user in an instant message protocol via the network.

33. The system of claim 31, wherein the message processor is connected to a query response server, the message processor being configured to evaluate the request by passing the request to the query response server.

34. The system of claim 33, further comprising a user profile database containing information associated with a plurality of users;
   the message processor being configured to access a profile associated with the user from the profile database and make at least a portion of the accessed profile available to the query response server.

35. The system of claim 33, wherein the message processor is configured to, if no profile is available, create a profile associated with the user and store the profile in the profile database.

36. The system of claim 35, wherein the message processor is configured to create a profile by soliciting profile information from the user and storing profile information provided by the user in the profile.

37. The system of claim 35, wherein the message processor is configured to solicit profile information by sending the user an instant message containing a cross-reference link directing the user to a web page configured to receive user input.

38. The system of claim 37, wherein the cross-reference link includes an embedded URL, the URL containing a key associated with the web page.

39. The system of claim 31, wherein the message processor is configured to:
   receive a notification from the query response server requesting additional data;
   solicit the requested additional data from the user in response to the receipt of an additional data notification; and
   make received additional data available to the query response server.

40. The system of claim 39, wherein the message processor is configured to save the received additional data in a profile associated with the user.

41. The system of claim 31, wherein the message processor is further configured to:
   receive a notification from the query response server requesting additional data;
   access a profile associated with the user;
   extract the requested additional data from the user; and
   make the additional data available to the query response server.

42. The system of claim 41, wherein the message server is configured to, if the requested additional data is not in the accessed profile, solicit the requested additional data from the user and save the additional data in the profile.

43. The system of claim 31, further comprising:
   a web server connected to the network; and
   a key-web page association table indicating an association between a specific key and a designated URL;
   the message processor being further configured to, in response to a determination that a user is to be granted authenticated access to a selected web page:
   generate a new access key;
   create a secret URL including the new access key;
   associate the secret URL with the selected web page in the key-web page association table; and
   send the secret URL to the first user in an instant message;
   the web server configured to, in response to the receipt of a web-page access request from a second user, the access request including a designated URL:
   parse the designated URL to extract a received access key;
   identify a designated web page associated with the received access key in accordance with data in the key-web page association table; and
   serve the designated web page to the second user.

44. The system of claim 43, wherein the association between the new access key and the selected web page is valid only for a predetermined period of time.

45. The system of claim 43, wherein the web server is configured to invalidate the association between the new access key and the selected web page when the designated web page is the selected web page.

46. A system for interactively responding to a user sending a message through an instant messaging network, comprising:
   a message processor connected to the instant messaging network; the message processor configured to:
   receive the message containing a request from the user via the instant messaging network in an instant messaging protocol;
   parse the message to extract the request;
   evaluate the request to identify at least one designated action suitable for fulfilling request;
   perform the at least one designated action;
   generate an output message containing results of the performance of the designated action; and
   send the output message to the user via the instant messaging network.

47. The system of claim 46, wherein the message processor is configured to send the output message to the user in an instant message protocol.

48. The system of claim 46, wherein the message processor is configured to respond to a request for information by passing the request to a query response server and receiving an answer from the query response server.

49. The system of claim 46, further comprising a user profile database; the message processor being further configured to:
- parse the message to extract a user ID;
- access a profile associated with the user ID, the profile containing information; and
- make at least some of the information in the accessed profile available for use during request evaluation and action performance.

50. The system of claim 49, wherein the processor is configured to respond to a profile maintenance request by accessing a particular profile associated with the user and updating the particular profile as specified in the request.

51. The system of claim 49, wherein the message processor is configured to determine if secondary information is required to fulfill the request and, if so, access the user profile to retrieve the secondary information.

52. The system of claim 51, wherein the message processor is further configured to solicit the secondary information from the user if the secondary information is not in the profile.

53. The system of claim 49, wherein the message processor is configured to save received secondary information in the profile.

* * * * *